Aug. 19, 1958 H. B. MILLER 2,848,158
POWER DRIVEN FARE COLLECTING AND REGISTERING APPARATUS
Filed March 21, 1951 13 Sheets-Sheet 1

INVENTOR.
Harry B. Miller
BY
ATTORNEYS.

Aug. 19, 1958        H. B. MILLER        2,848,158
POWER DRIVEN FARE COLLECTING AND REGISTERING APPARATUS
Filed March 21, 1951        13 Sheets-Sheet 2
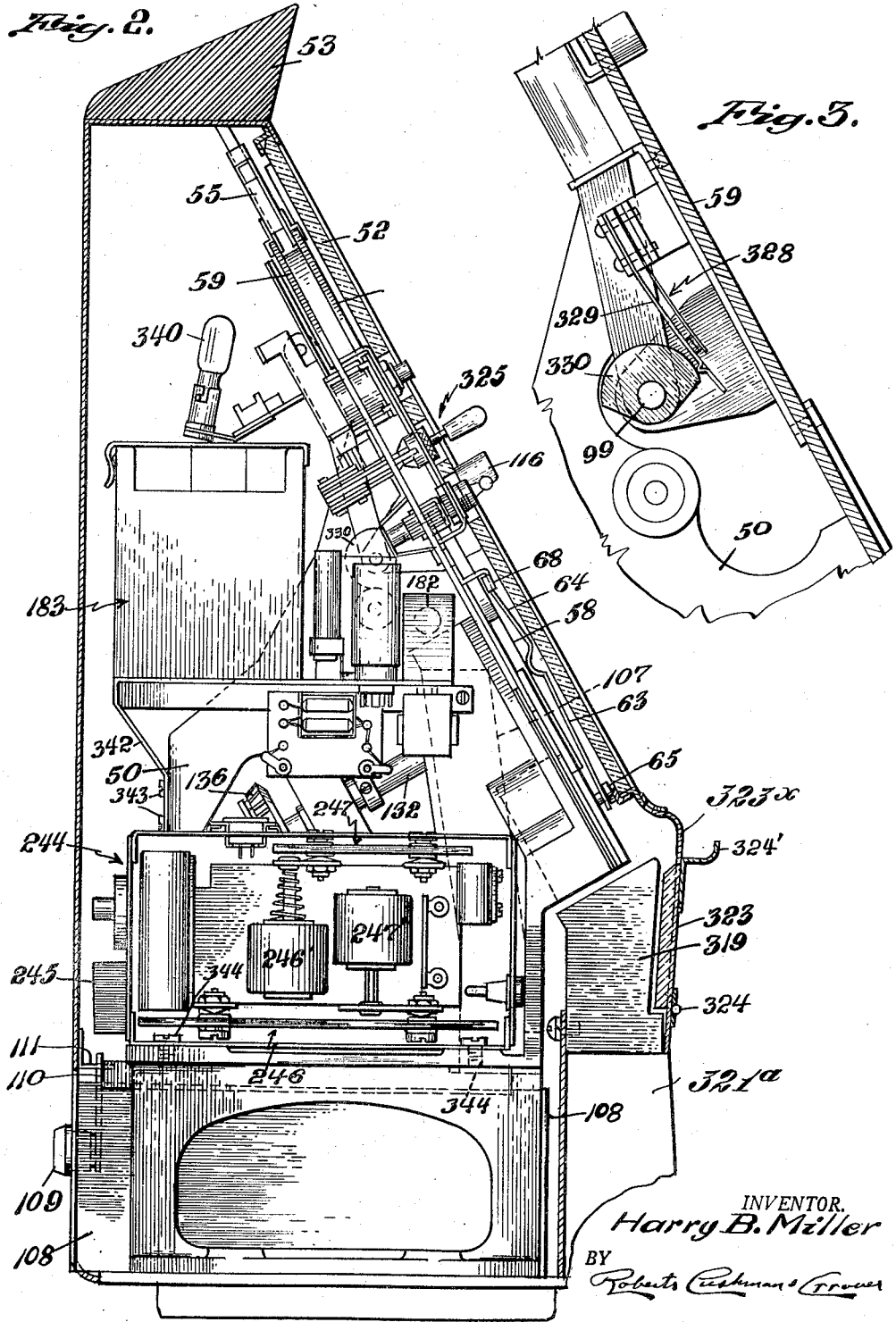
INVENTOR.
Harry B. Miller
BY
Roberts Cushman & Grover
ATTORNEYS.

Aug. 19, 1958

H. B. MILLER 2,848,158

POWER DRIVEN FARE COLLECTING AND REGISTERING APPARATUS

Filed March 21, 1951

INVENTOR.
Harry B. Miller
by Roberts Cushman & Grover
ATTORNEYS.

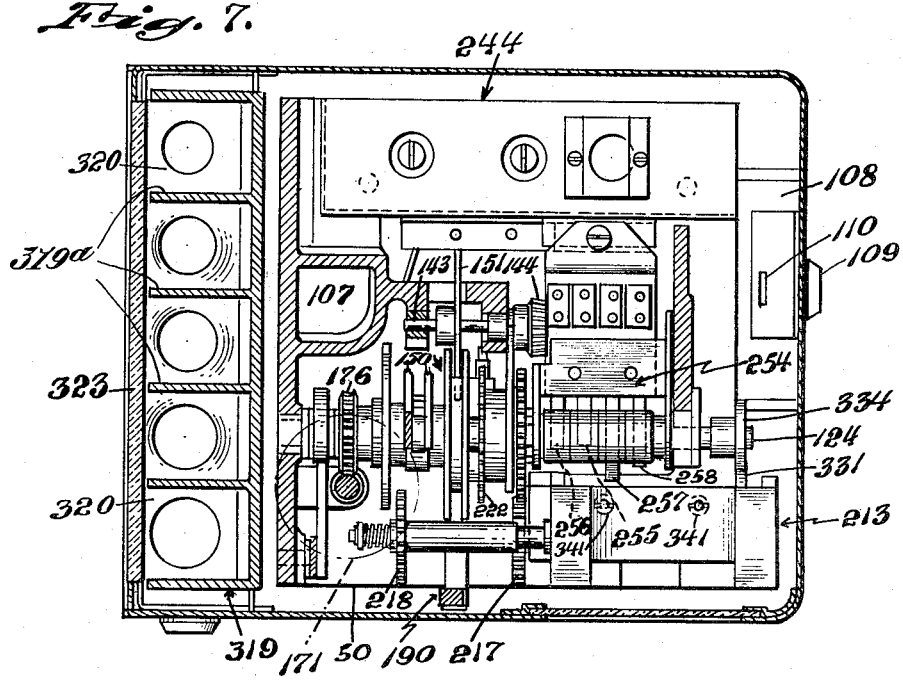
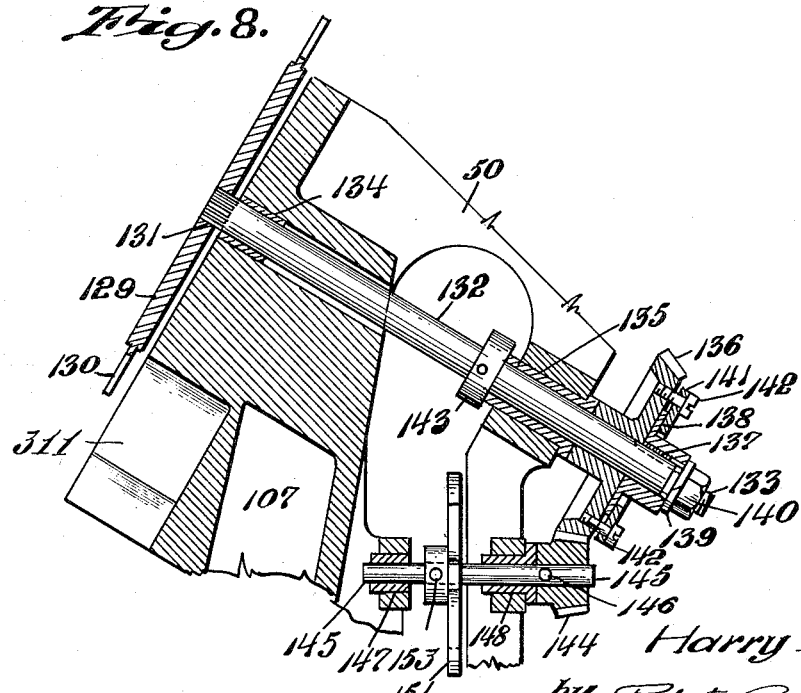

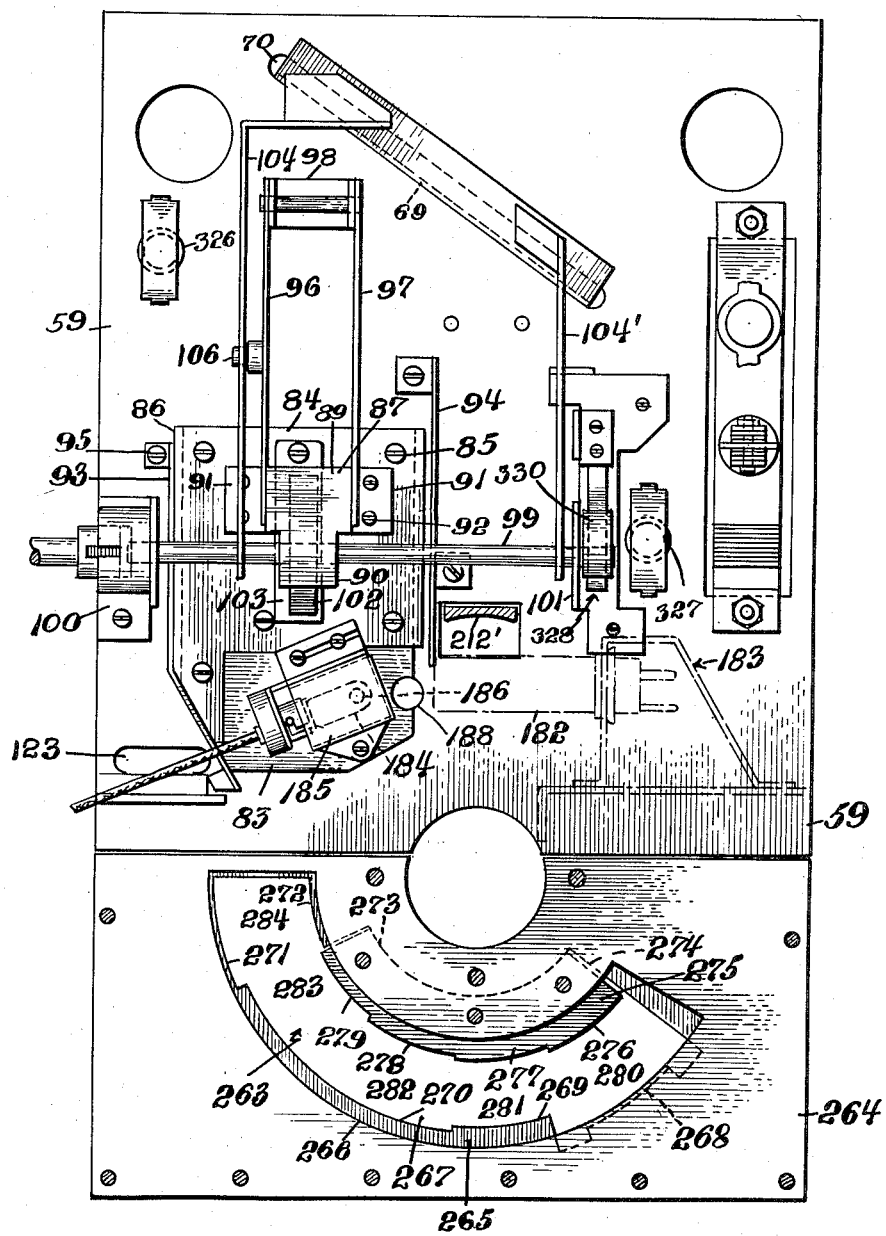

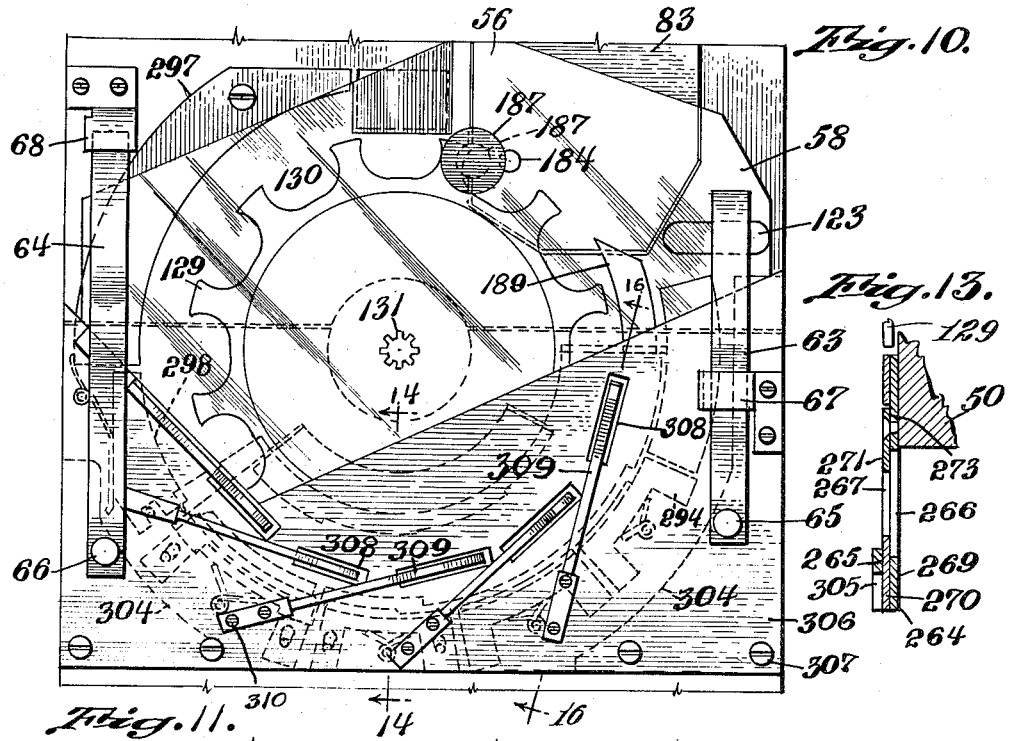
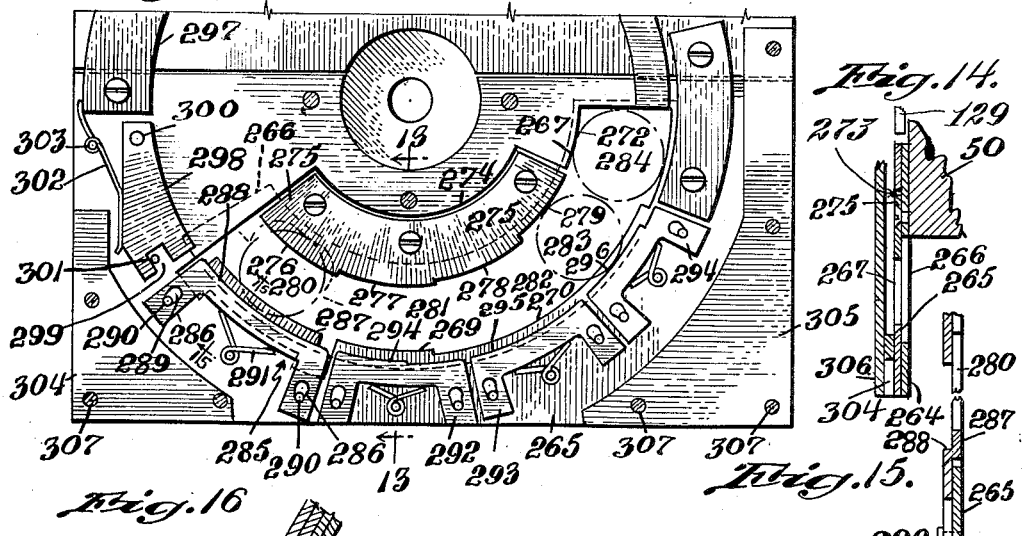
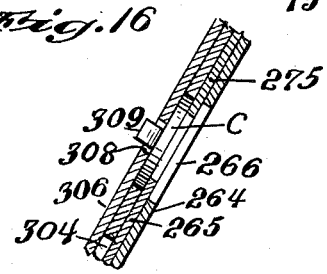

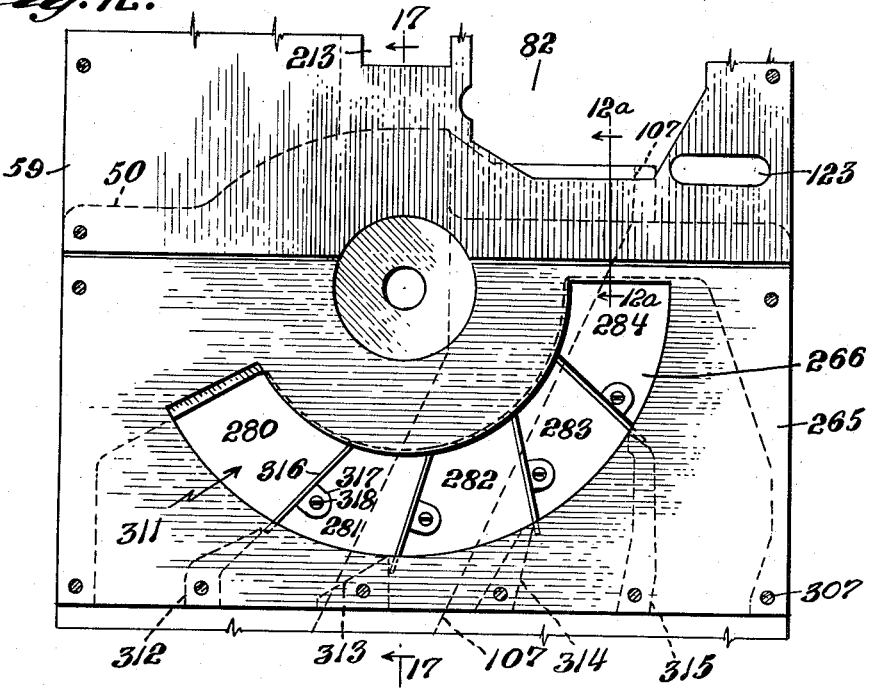
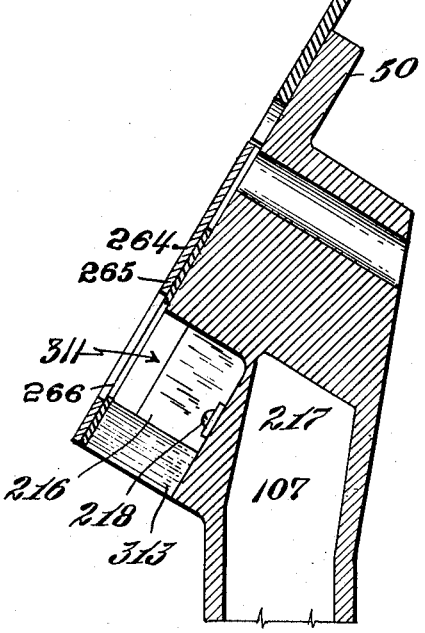

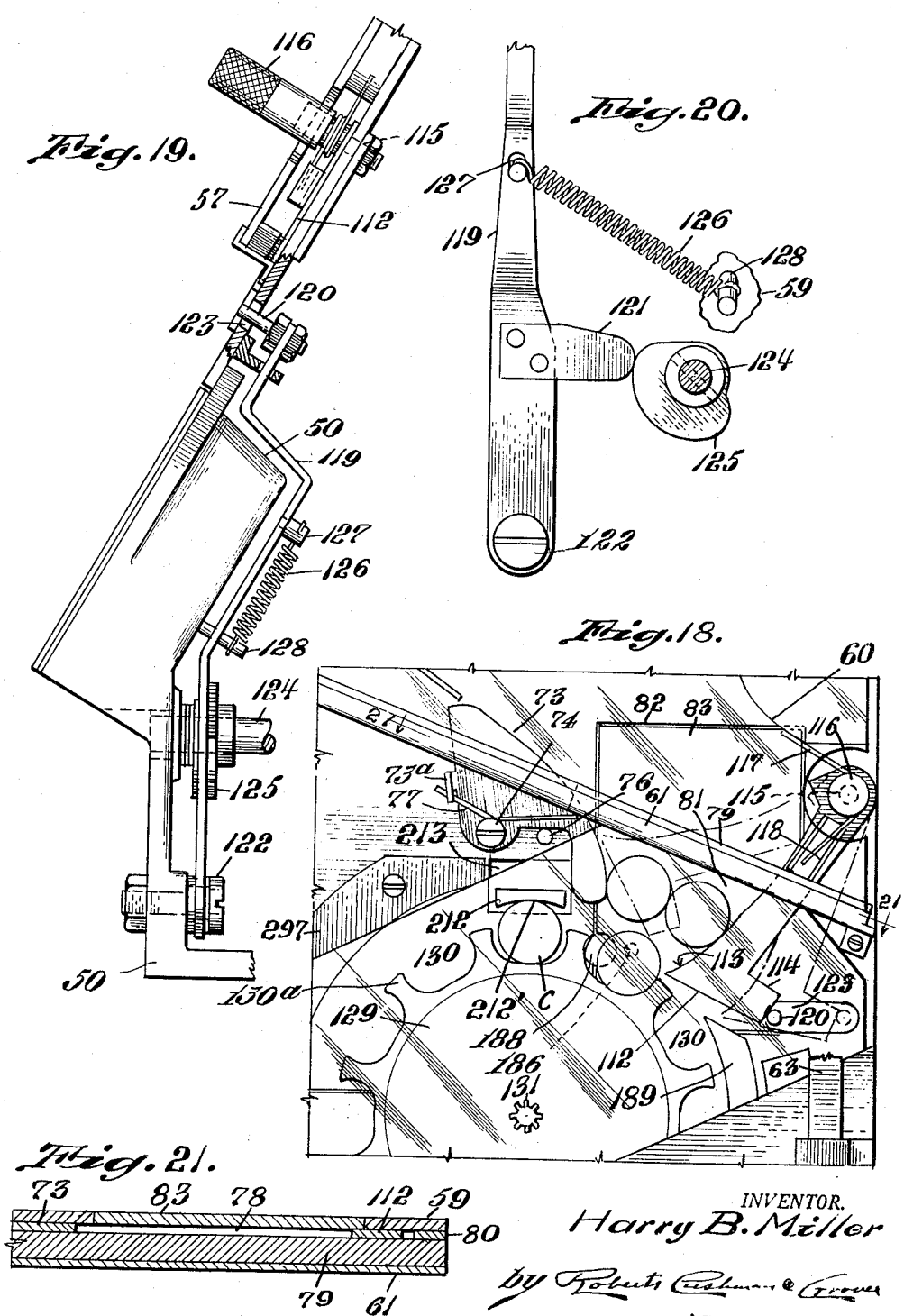

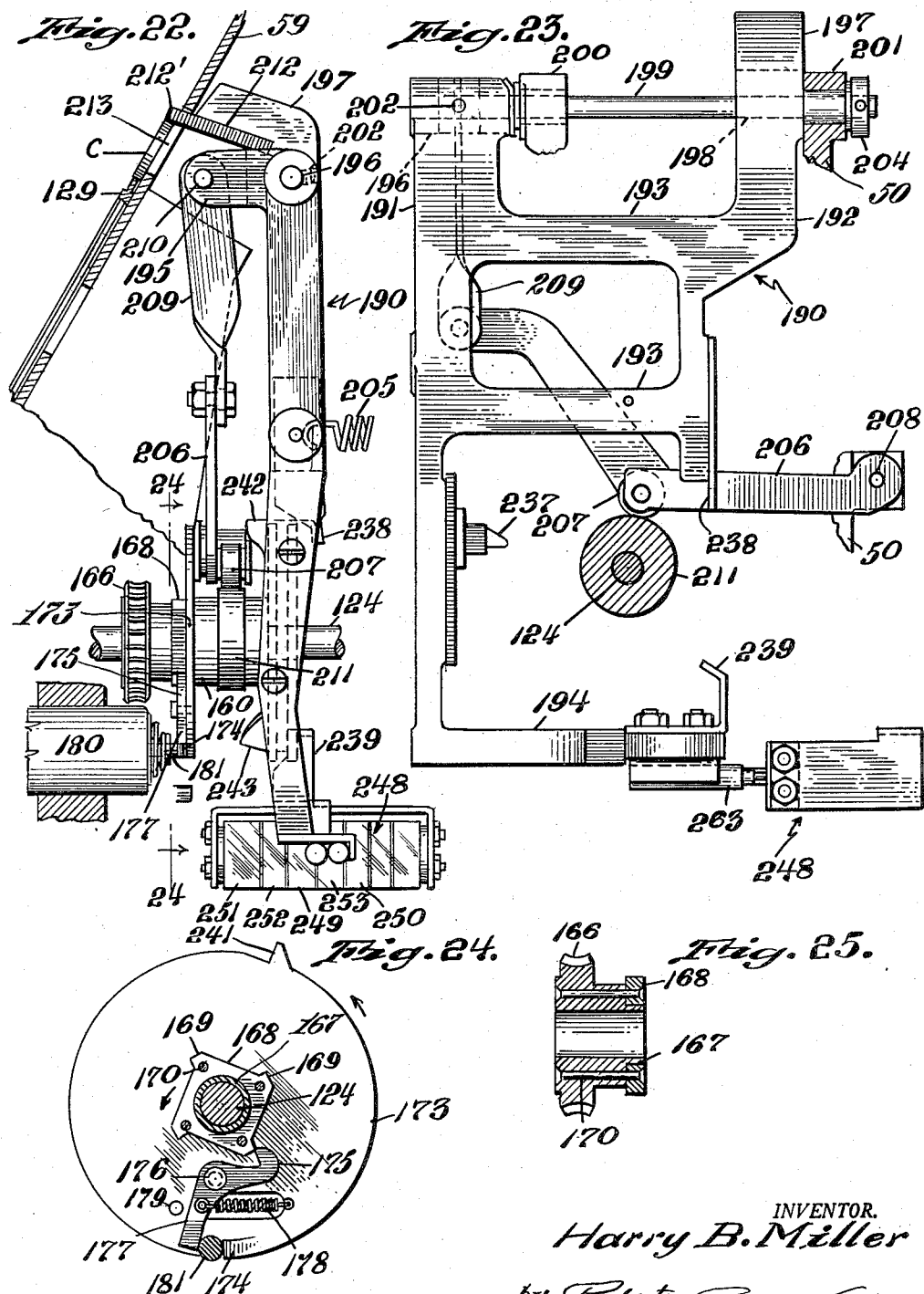

Aug. 19, 1958 H. B. MILLER 2,848,158
POWER DRIVEN FARE COLLECTING AND REGISTERING APPARATUS
Filed March 21, 1951 13 Sheets-Sheet 10
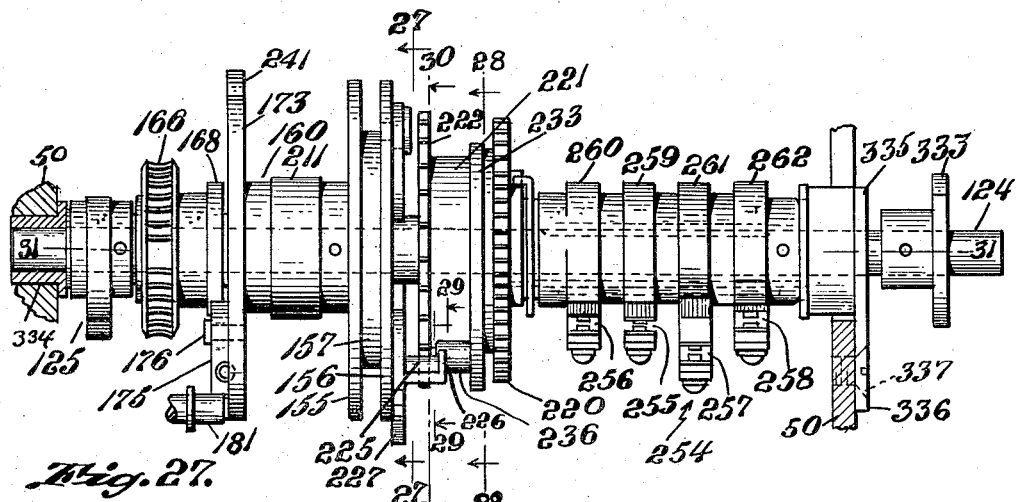
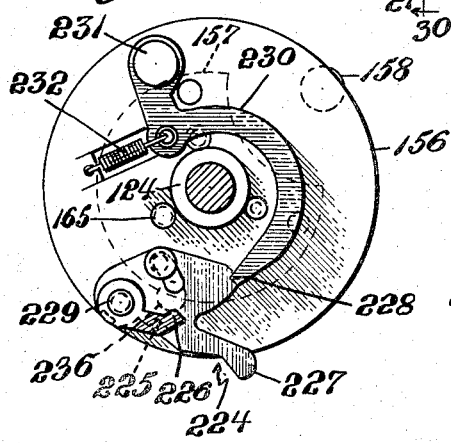
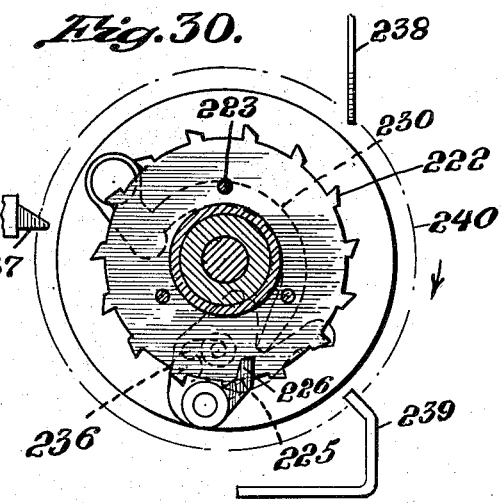
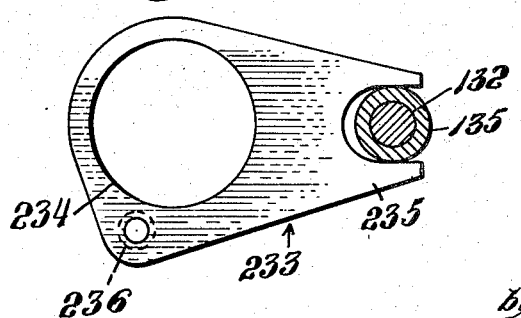
INVENTOR.
Harry B. Miller
by Roberts Cushman & Grover
ATTORNEYS.

Aug. 19, 1958 H. B. MILLER 2,848,158
POWER DRIVEN FARE COLLECTING AND REGISTERING APPARATUS
Filed March 21, 1951 13 Sheets-Sheet 11
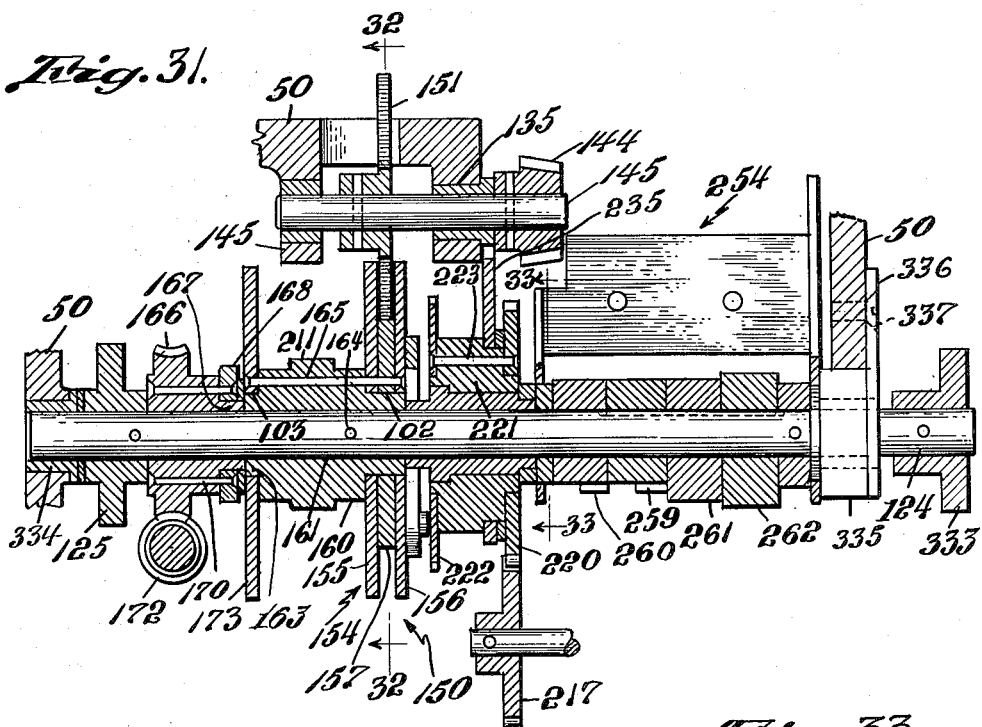
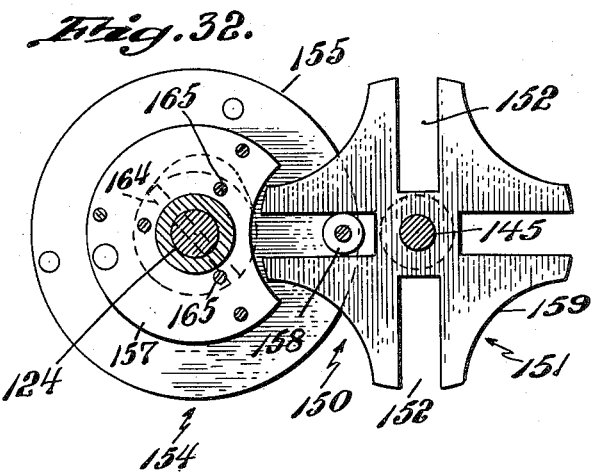
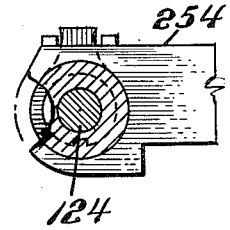
INVENTOR.
Harry B. Miller
by Roberts Cushman & Grover
ATTORNEYS.

Aug. 19, 1958     H. B. MILLER     2,848,158
POWER DRIVEN FARE COLLECTING AND REGISTERING APPARATUS
Filed March 21, 1951                                          13 Sheets-Sheet 12

INVENTOR.
Harry B. Miller
by Roberts Cushman & Grover
ATTORNEYS.

Aug. 19, 1958  H. B. MILLER  2,848,158
POWER DRIVEN FARE COLLECTING AND REGISTERING APPARATUS
Filed March 21, 1951  13 Sheets-Sheet 13
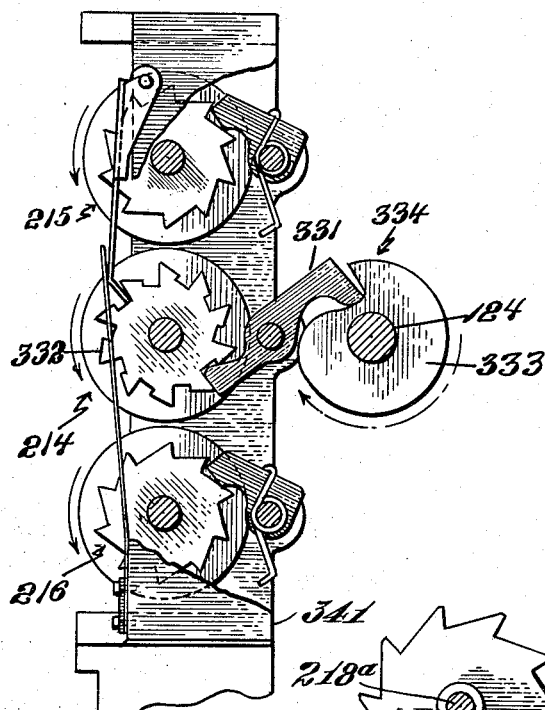
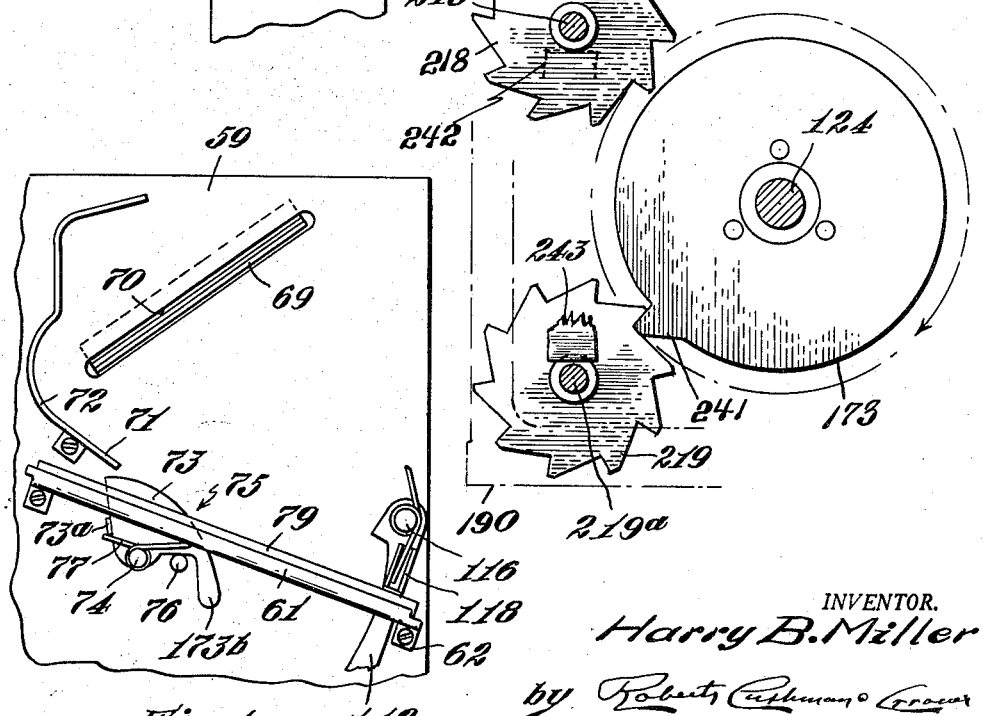
INVENTOR.
Harry B. Miller
by Roberts, Cushman & Grover
ATTORNEYS.

United States Patent Office 2,848,158
Patented Aug. 19, 1958

2,848,158

POWER DRIVEN FARE COLLECTING AND REGISTERING APPARATUS

Harry B. Miller, Warwick, R. I., assignor, by mesne assignments, to Grant Development Company, Providence, R. I., a corporation of Rhode Island Application March 21, 1951, Serial No. 216,703

42 Claims. (Cl. 235—32)

This invention pertains to fare collecting apparatus, for example apparatus employed in public transportation systems for collecting the fares of passengers, and more especially to apparatus designed to collect fares, including multiple-coin fares, to register such fares and to distribute coins of different denominations respectively into different receptacles.

As hereinafter more fully described the invention is embodied in fare collecting apparatus designed particularly for use in public buses.

Notwithstanding the congestion often encountered on bus routes and despite the difficulties resultant from weather conditions, the bus driver is expected to maintain a definite schedule while guiding his heavy vehicle with its load of human freight, meantime watching other vehicles and traffic signals; watching for waiting passengers and calling street names; remembering to discharge passengers at designated destinations along the route; opening and closing the door, making change and giving transfers; and carefully examining the fares paid by each passenger to check for the correct amount, and to detect bad coins.

These many duties imposed upon the bus driver have made it imperative to devise mechanical means for relieving him of some, at least, of these burdens. Thus, to assist the bus driver in the collection of fares as well as to keep check on the bus driver himself as to the number of fares collected, it has become usual to provide fare collecting and registering mechanism into which the passenger himself is required to drop the fare. After passing through this mechanism the fare may then, for the first time, be handled by the driver. Such machines as heretofore customarily used, require more or less attention on the part of the bus driver not only in the visual examination of the fare deposited, but for the manual operation of parts of the machine in registering or in removing the registered fare from the apparatus.

One of the principal objects of the present invention is further to lighten the burden on the bus driver, so far as the collection of fares is concerned, by the provision of power driven collecting and registering mechanism which demands the minimum of attention or manipulation by the driver. Another object is to provide fare collecting mechanism so devised as to facilitate the deposit of the fare so that the passenger may quickly move along into the bus, thus preventing congestion at the door. A further object is to provide fare collecting mechanism which will receive and register a multiple fare, comprising coins of different denominations. A further object is to provide fare collecting mechanism whose operation is automatically started by the mere deposit of the fare and which will register the fare deposited before its cycle of operation ceases. A further object is to provide fare collecting mechanism designed to emit a characteristic audible signal for each respective denomination of coin which is placed in the machine so that by listening and without looking at the machine, the driver may know the amount of fare deposited. A further object is to provide a machine which will enable the operator to view the coins as they are deposited and before registration takes place and so devised as to exhibit the fare, including a number of coins, if it be a multiple fare, so that they are all clearly visible both before and after registration, although protected from access. A further object is to provide a fare collecting mechanism so arranged that as the fares pass through the machine the coins rest upon an inclined surface where they are fully exposed to view even though, in the case of a multiple fare, they may enter the machine in haphazard order. A further object is to provide coin collecting apparatus wherein the fare, although comprising a multiple of coins, is so divided and directed, in traveling through the machine, that the moving coins perform certain desirable mechanical functions, although moving under the control of gravity through the machine. A further object is to provide a coin collecting and registering machine wherein the denomination of any individual coin deposited is determined by measurement of its diameter and wherein such measurement of the coin diameter actuates registering means and also sound-emitting elements. A further object is to provide fare collecting mechanism wherein the coin guiding elements are so arranged as to minimize any tendency of the coins to shingle, bridge or jam so as to interfere with the operation of the machine parts. A further object is to provide fare collecting means so devised that only coins of certain predetermined denominations and coins of normal shape of such dimensions will be able to enter the registering mechanism and whereby bent coins or slugs will be stopped before entering the registering means and remain in full view of the operator and with provision for discharging such bent coins or slugs without passing through the registering mechanism. A further object is to provide coin collecting and registering means having provision for bypassing bent coins or slugs into a locked receptacle, the contents of which are not accessible to the bus driver. A further object is to provide coin collecting and registering mechanism wherein the main portion of the coin path and the devices for guiding the coins along said path are at the front of the machine and visible through a transparent cover so that the passing coins may be readily viewed, and with the actuating mechanism located at the rear of the coin path or otherwise concealed. A further object is to provide coin collecting and registering apparatus so designed that units of mechanism which perform specifically different functions may be assembled independently within the frame of the machine and similarly removed without disturbing other units, so that in the event of the failure of one unit, it may be removed and a substitute unit installed without necessitating the removal of the entire machine from the bus. Other and further objects and advantages of the invention will be pointed out in the following more detailed description and by reference to the accompanying drawings wherein Fig. 1 is a central, vertical section through an electrically operated fare collecting and registering machine embodying the present invention, the pedestal upon which it is supported being omitted;

Fig. 2 is a view similar to Fig. 1 but looking at the machine from the opposite side thereof;

Fig. 3 is a fragmentary sectional view, to a larger scale than Fig. 2, showing in greater detail some of the parts illustrated in Fig. 2;

Figure 1:
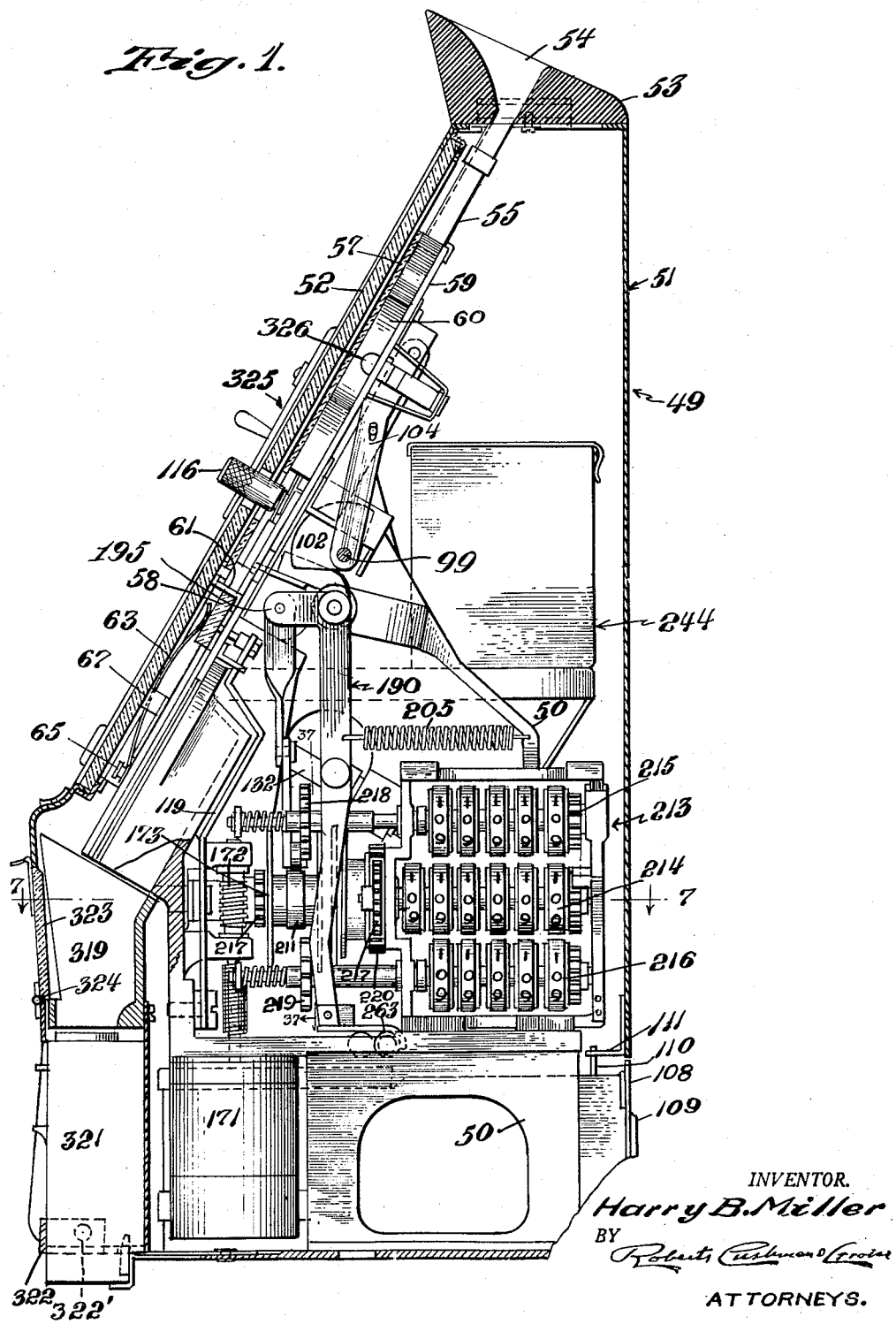
Figure 4:
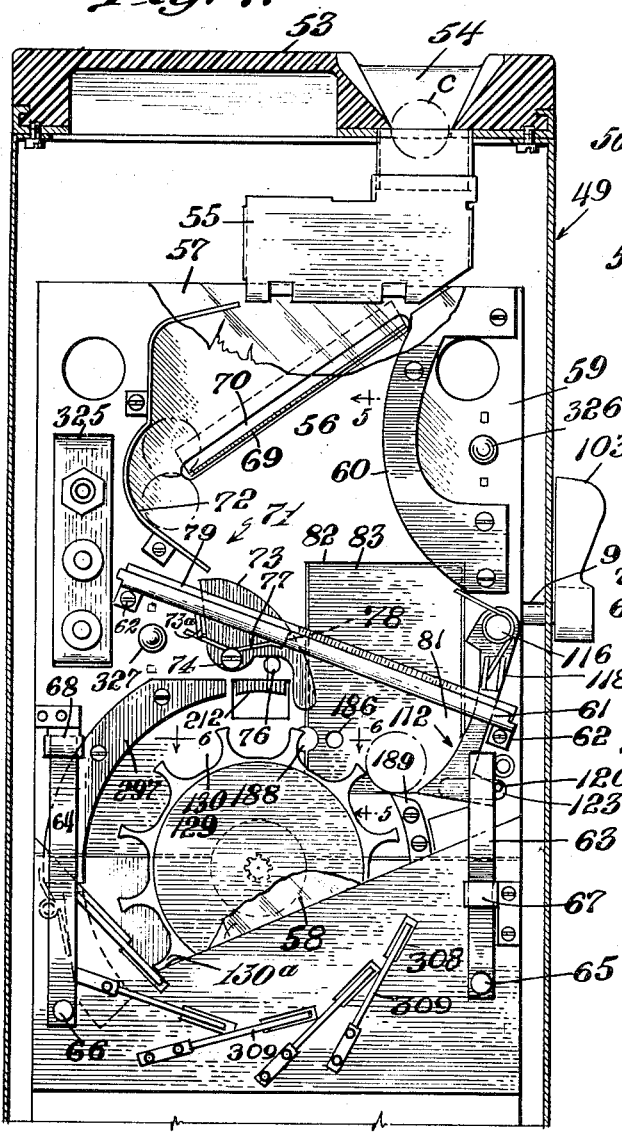
Fig. 4 is a section, looking from the front, in a plane parallel to the front face of the coin supporting plate.
Figure 5:
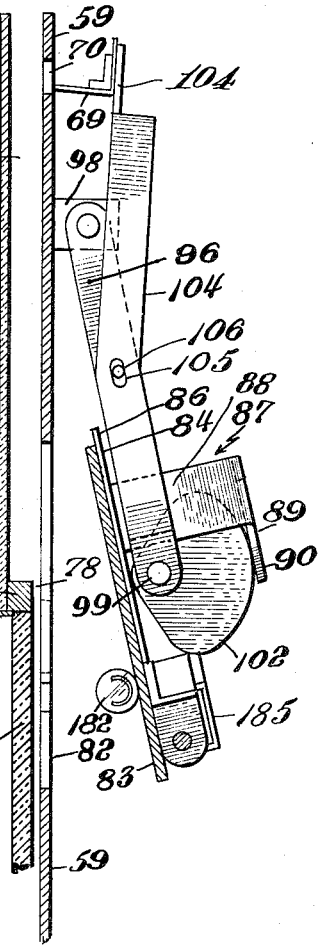
Figure 6:
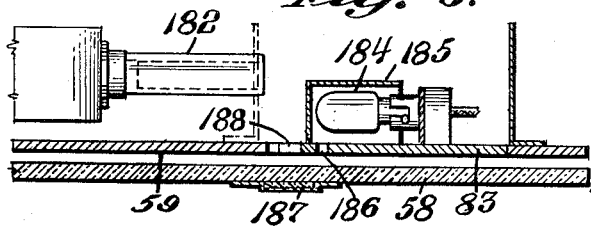
Figure 34:
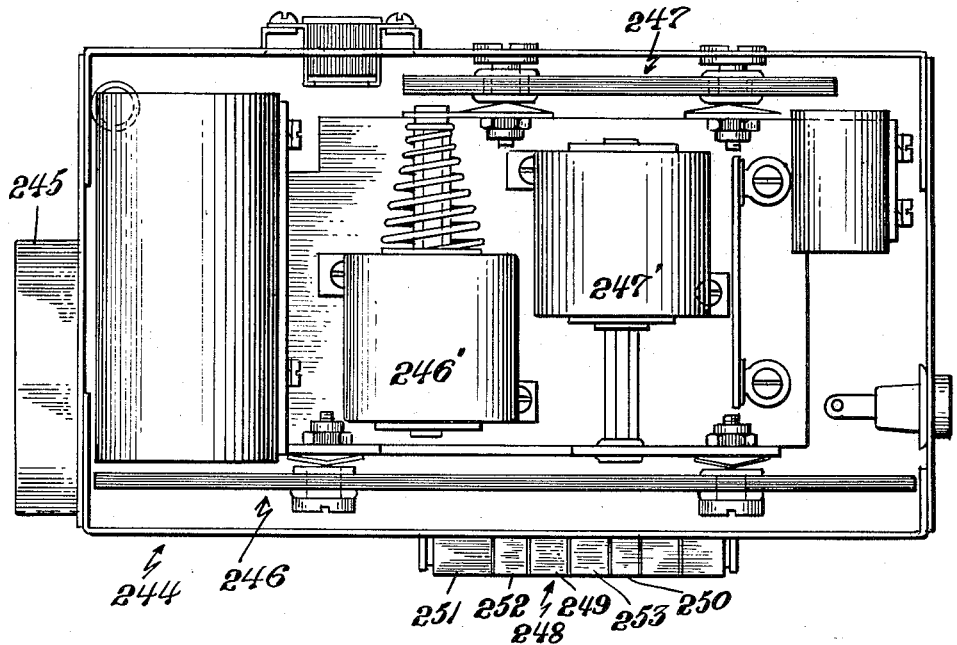
Figure 35:
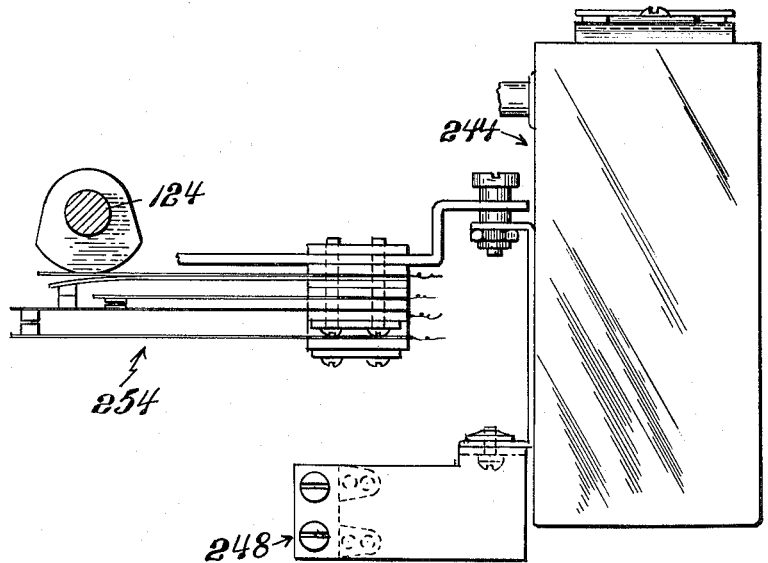

Fig. 4ᵃ is a fragmentary view showing the coin guiding elements which direct the coins down toward the point at which the coins are separated from the bent coins or slugs;

Fig. 5 is a section substantially on the line 5—5 of Fig. 4, showing the discharge or scavenger opening for bad coins and the door or closure therefor in open position;

Fig. 6 is a fragmentary section, to larger scale, substantially on the line 6—6 of Fig. 4, showing the relative position of a photocell and its exciter lamp, said cell and lamp constituting the detector means whereby the motor is energized in response to the passage of a coin;

Fig. 7 is a horizontal section substantially on the line 7—7 of Fig. 1;

Fig. 8 is a fragmentary section in the vertical plane of the axis of the coin receiving rotor, showing the rotor shaft and the gear train for driving it;

Fig. 9 is a rear elevation of the coin supporting plate and assorting device, and showing parts located at the rear side of the supporting plate;

Fig. 10 is a fragmentary section, to larger scale, on the same plane as Fig. 4, showing the rotor and parts of the coin assorting mechanism;

Fig. 11 is a view similar to Fig. 10, but in a plane slightly to the rear of that of Fig. 10;

Fig. 12 is a view similar to Fig. 11 but in a plane slightly to the rear of the latter;

Fig. 12ª is a fragmentary section on the line 12ª—12ª of Fig. 12;

Fig. 13 is a fragmentary section substantially on the line 13—13 of Fig. 11;

Fig. 14 is a fragmentary section substantially on the line 14—14 of Fig. 10;

Fig. 15 is a fragmentary section substantially on the line 15—15 of Fig. 11;

Fig. 16 is a fragmentary section substantially on the line 16—16 of Fig. 10, with the parts in their normal inclined position;

Fig. 17 is a fragmentary section, in the vertical plane of the rotor shaft and substantially on the line 17—17 of Fig. 12;

Fig. 18 is a view generally similar to Fig. 10 with parts omitted;

Fig. 19 is an edge view of the coin feeder element and its operating lever with certain associated parts and with parts in vertical section;

Fig. 20 is a fragmentary rear elevation of the coin feeder arm and lever with its operating cam;

Fig. 21 is a fragmentary section substantially on the line 21—21 of Fig. 18;

Fig. 22 is an edge elevation of the coin gauging element and associated parts;

Fig. 23 is a rear elevation of the gauging arm and its operating lever;

Fig. 24 is a section on the line 24—24 of Fig. 22;

Fig. 25 is a diametrical section of the worm gear shown in Fig. 22;

Fig. 26 is an elevation of the main shaft assembly;

Figs. 27, 28 and 29 are transverse sections on the lines 27—27, 28—28, 29—29 respectively of Fig. 26;

Fig. 30 is a section on the line 30—30 of Fig. 26, showing the relation of the toothed gear and its operating cams;

Fig. 31 is a section in the axial plane of the shaft shown in Fig. 26, showing its relation to other elements of the mechanism;

Fig. 32 is a section on the line 32—32 of Fig. 31;

Fig. 33 is a fragmentary section on the line 33—33 of Fig. 31;

Fig. 34 is a rear elevation of the sound-producing device;

Fig. 35 is a side elevation of the sound-producing device of Fig. 34;

Fig. 36 is an end elevation, partly in vertical section, of the counter mechanism; and Fig. 37 is a fragmentary vertical section, to larger scale, substantially on the line 37—37 of Fig. 1.

Briefly stated the structure and operation of the machine is substantially as follows: The machine comprises a hopper into which a fare, which may consist of a number of coins, may be dropped, the delivery opening at the bottom of the hopper being of a size such that coins larger than the maximum diameter which may be handled by the machine cannot pass therethrough. The coins which pass through this opening move directly by gravity while leaning against a forwardly and downwardly inclined supporting plate where they are plainly visible to the bus driver and in so moving down also move transversely, first in one direction and then in another in response to contact with guiding elements, so that the coins spread out and arrive one at a time at a location where they are gauged for thickness. Should a coin arriving at this gauging position be bent or abnormally thick, it will pass no further through the machine but will remain exposed to view and may be manually ejected from the normal coin path and delivered into a locked box apart from the normal coins. After gauging for thickness, a normal coin moves further down by gravity to a feeding station where it enters a pocket in a rotor and in entering the pocket, automatically energizes a motor starter thereby initiating a cycle of operation of the machine. As often as a fresh coin enters a pocket of the rotor, the motor which drives the machine will be energized so as to carry the mechanism through one complete cycle of operation. Each coin, as it is picked up in a pocket of the rotor, is transferred by the latter to a gauging station where it is measured for diameter. In response to this measurement, a counter automatically records in dollars and cents the amount of fare comprised in the coin so gauged. At the same time an audible signal is emitted which is distinctive for each particular diameter of coin. When coins cease to enter the pockets of the rotor, the machine stops and the last several coins, for instance five, which have been picked up by the rotor and gauged, are held in the rotor pockets in full view through a transparent panel. When another fare is deposited in the hopper the coins forming the previous fare are discharged from the rotor, and the several coins are sorted as to size and deposited in a container wherein coins of like denomination are stacked together. After having been sorted and stacked in this manner, coins may be removed from the machine by the bus driver or alternatively they may be locked in the machine, as the driver may elect. Through most of their travel through the machine, the coins are in full view (although inaccessible) so that it is easy to note the number and denominations of the coins both prior to and after gauging.

The whole machine is arranged on the unit principle there being a unit 183 (Fig. 2) for the electrical mechanism; a unit 244 (Figs. 2 and 34) for the sound-emitting mechanism; a drive shaft assembly 254 (Figs. 7 and 26) which may be removably positioned in the machine; a counter unit 213 (Fig. 1); a sorting mechanism 319 (Fig. 1) and a change-making or storing unit 321 (Fig. 1). These several units may be individually removed from the machine and a replacement unit inserted, should any particular unit require repair.

Referring to the drawings for a more detailed description of the invention, the numeral 49 (Fig. 1) designates in general the electrically operated apparatus of the present invention. This apparatus comprises a main supporting frame 50 (Figs. 1 and 2) which may be a casting and on which are mounted the various operative instrumentalities of the machine. This frame 50 is enclosed in a casing 51 (Figs. 1, 2 and 4) which may be of sheet material, having a front closure panel or window 52 of glass or other transparent material through which the component parts of a fare, for example a plurality of coins of different denomination, while separated one from the other, are fully exposed to view prior and subsequent to the registration of the coins. A coin hopper 53 (Figs. 1 and 2) of transparent material, is mounted at the top of the casing 51, and has a fare receiving cavity 54 into which a fare, comprising one or more coins, may be deposited for collection. The hopper has an elongate slot at its bottom of a length to permit coins, up to a predetermined diameter, to pass downwardly therethrough. The fare, which may consist of a plurality of similar or different coins or tokens or a combination of coins and tokens, is guided, after passing down through the outlet slot, by a coin chute 55 (Figs. 1, 2 and 4) which may be of metal, or preferably transparent material, so as to drop into a fare receiving chamber 56 (Figs. 4 and 5) which is located in the front portion of the casing and behind the window 52. The chamber 56 is defined by transparent upper and lower front wall portions 57 and 58 (Fig. 5) and a coin supporting plate or rear wall 59 (Figs. 1, 4a, 5, 17, 21 and 22). This plate or rear wall 59 is fixed to the supporting frame 50 and extends parallel to but spaced from said transparent front wall portions 57 and 58 and is inclined to the horizontal at a suitable angle to insure the downward sliding of the coins at a limited velocity. Thus, for example, the plate may make an angle of 60° to the horizontal, thus substantially reducing the speed with which coins (leaning back against the plate 59) travel as they move down through the chamber 56, as compared with their speed if they were to drop freely. The front wall portion 57 (Fig. 5) is spaced from the rear wall 59 by a spacer member 60 (Fig. 4) but is near enough to wall 59 to prevent a coin from tipping over, and is supported at its lower edge by an angle iron 61 (Fig. 5) which is secured at its opposite ends to the coin supporting plate or rear wall 59 by means of screws 62 (Fig. 4). The distance between the lower front wall portion 58 and the rear wall 59 is less than the distance between the upper front wall 57 and the rear wall 59. The lower wall portion 58 is removably held in place by bowed springs 63 and 64 (Fig. 4) each of which is pivotally secured near its lower end, as shown at 65 and 66 respectively, to the rear plate 59 and extends upwardly into engagement with the wall portion 58, being normally held in position by catches 67 and 68 respectively.

The fare to be collected which, as above noted may consist of one or several coins, drops from the chute 55 onto the rear wall or coin support 59 and in sliding down comes into contact with an inclined track 69 (Figs. 4 and 4a) which extends downwardly and to the left, the coin or coins constituting the fare tending to roll down along the track by gravity and in so doing becoming separated one from the other. The rear margin of the track 69 extends rearwardly through a slot 70 (Figs. 4 and 5) in the rear wall 59 and is secured to a movable support 104, 104' hereafter more fully described so that the track may be moved into or out of the chamber 56. The separated coins constituting the fare are delivered by the track 69 onto a second track comprising a substantially straight portion 71 (Fig. 4a) which is inclined to the horizontal in the opposite direction from the inclination of track 69 so as to direct the moving coins to the right instead of to the left. This tends to reverse the rotation of the coins thereby further reducing their speed. This second track 71 has an arcuate upper portion 72 which is concave toward the right (Fig. 4a). Coins delivered from the lower end of the stationary track 71 continue to move downwardly and to the right, in rolling along the convexly curved surface 75 of a guide 73 (Figs. 4, 4a, and 18) which is pivotally mounted on a stud 74 whose rear end is fixed to the wall 59. The guide 73 is normally held in coin-guiding position against a stop 76 by means of a spring 77 having one arm which engages a lip 73a projecting forwardly from the part 73 and whose opposite end engages a fixed part. The coins which roll from the part 71 onto the curved upper edge 75 of guide 73 are assorted as to thickness by means of a transversely extending bar 79 (Figs. 4, 5 and 21) spaced forwardly from the rear wall 59 to form a slot 78 (Figs. 5 and 21) of a width just sufficient to permit a coin of normal thickness to pass down between the bar and the rear wall 59 but to prevent passage of bent coins or slugs of a thickness exceeding that of a normal coin. The bar 79 extends transversely across the chamber 56 and is inclined to the horizontal in the general direction of the track member 71. The bar is supported by the angle iron 61 (Fig. 5) and is spaced from the rear wall 59 by spacer washers 80 (Fig. 21) which determine the width of the slot 78. Coins which can pass down through the slot 78 drop into the lower portion 81 (Figs. 4 and 18) of the chamber 56. The bar 79 together with the angle iron 61 provides a pocket (Fig. 5) for the reception of the lower edge of the upper front wall portion 57.

The rear wall 59 has a discharge or scavenger opening 82 (Fig. 5) which is located at that part of chamber 56 at which coins, tokens or slugs, unable to pass down through the slot 78, would collect. This opening is normally closed by a plate or door 83 (Figs. 4 and 5) which is so supported as to be manually movable into and out of closing relation to said opening 82. To this end the plate 83 has a mounting member or plate 84 (Figs. 5 and 9) secured to its rear face by screws 85. The mounting plate extends beyond the door proper, to provide a marginal lip 86 which lies to the rear of the plate 59 when the door is closed so as to overlap the edges of the opening 82 and seal the opening against the passage of light from the front of the machine when the door is closed. The front face of the door 83, when the door is closed, is flush with the forward face of the plate 59.

A hollow bracket 87 (Figs. 5 and 9) is fixed to the part 84 so as to project rearwardly from the latter. This bracket has spaced, parallel side walls 88 and a rear wall 89, the latter having a portion 90 which projects down below the side walls 88. The bracket has feet 91 (Fig. 9) which are attached by screws 92 to the part 84. Hanger arms 96 and 97 are secured at their lower ends to the respective side walls 88 of the bracket and extend upwardly from the bracket and are pivotally supported at their upper ends by a part 98 which is fixed to the rear side of the wall 59. The door or closure 83 is thus supported so that it may be swung to and from closed position. Fixed guards 93 and 94 (Fig. 9) are positioned at opposite sides respectively of the opening 82 and are secured to the wall 59 by means of screws. The closure or door 83 is movable from open to closed position by the rotation of a shaft 99 (Figs. 3, 5 and 9) which is journaled in bearings 100 and 101 (Fig. 9) carried by the rear wall 59. A cam 102 is fixed to this shaft, being located between the side walls 88 of the bracket 87. When this shaft 99 is turned in one direction, the cam will engage the part 90 of the bracket and will thus swing the closure or door rearwardly to open position, and when the shaft is turned in the other position the cam will engage the part 84 and thereby swing the door or closure forwardly to the closed position, the cam being so shaped as to hold the door in closed position until the shaft is again turned in the reverse direction. A handle 103 (Fig. 4) is connected to one end of the shaft 99 for turning the latter.

The inclined track 69, above described, is carried by a pair of parallel arms 104 and 104' (Figs. 5 and 9) whose upper ends are attached to opposite ends respectively of the track 69 and whose lower ends are pivoted on the shaft 99. The arm 104 is provided with an elongate opening 105 (Fig. 5) through which passes a stud 106 carried by the arm 96 so that upon movement of the arm 96, in opening or closing the door 83, the stud 106 will engage the walls of the opening 105 and thereby swing the arm 104 about the shaft 99, the arm 104' swinging at the same time. The track 69 is thus moved in or out of the chamber 56 through the opening 70.

Should a crooked coin, a thick slug or other non-registrable material enter the chamber 56, it will be stopped on the track 69 or by the bar 79 and held where it may be seen through the window 52. By turning the handle 103, the door or closure member 83 may be swung rearwardly to the open position, the track 69 being simultaneously withdrawn rearwardly from the chamber 56, and thus any non-registrable material which has come to rest on the track 69 or on the bar 79 will fall rearwardly out of the chamber 56 through the opening 82 and into a guide passage 107 formed within the frame 50 (Figs. 2, 7, 8, 12 and 12ª). The passage 107 is open at its upper end at a point just below the lower edge of the opening 82 (Fig. 12ª). The lower end of the passage 107 is arranged to discharge into a receptacle 108 (Fig. 2) housed within the lower portion of the frame 50. This receptacle 108 is secured in position, so as to be inaccessible, by means of a lock 109 (Fig. 2) of usual construction, having a bolt 110 which is projected into engagement with a retainer 111.

An oscillatory coin feeder or guide 112 (Figs. 4 and 18), having a concave coin engaging edge 113 and a rearward foot portion 114, extends down through the slot 78. It is fixed at its upper end to a shaft 115 (Figs. 4, 4ª and 18) turning in bearings carried by the rear wall 59. This shaft has a handle 116 (Figs. 1 and 2) whereby it may be turned so as to swing the guide 112. A spring 117 (Figs. 4 and 18) encircles the shaft 115, with one end engaging the spacer member 60 and the other engaging a lip 118 (Fig. 4) projecting from the feeder 112, the spring tending to move the feeder in a counterclockwise direction as viewed in Figs. 4 and 18. The feeder 112 is automatically swung, at times, in a clockwise direction by means of a lever 119 (Figs. 19 and 20) which has a forwardly projecting stud 120 (Fig. 18) at its upper end and a cam follower element 121 (Fig. 20) intermediate its ends. The lever 119 is pivoted at its lower end at 122 to a part of the frame and extends upwardly therefrom, the stud 120 extending forwardly through a horizontally elongate slot 123 (Figs. 4, 18 and 19) in the rear wall 59 so as to engage the foot portion 114 of the feeder 112. A main drive shaft 124, hereafter more fully described, carries a cam 125 (Fig. 20) which engages the cam follower 121 on the lever 119, thereby to swing the lever in a clockwise direction. A tension spring 126 is secured at one end to a pin 127 projecting from the lever 119 and at its other end to a pin 128 projecting from the wall 59, the spring tending to swing the lever in a counterclockwise direction so as normally to position the pin 120 at the left hand end of slot 123. Upon rotation of the shaft 124, the lever 119 will be swung about its pivot 122 and will thereby allow spring 117 to move the feeder 112 in a counterclockwise direction.

When the machine is at rest, the coin feeder 112 is in the coin-guiding position shown in Fig. 18, but during each cycle of operation of the machine, the feeder 112 will be retracted by the action of the spring 117 to the position shown in Fig. 4 and held there momentarily, and then quickly swung back by the action of spring 126 and cam 125 to its initial position. This rocking of the feeder 112 wil agitate coins within the lower portion 81 of the chamber 56 so as to break up any jam of the coins and to cause any coins which have become shingled to lie in the same plane. The feeder 112 may also be moved manually by means of the handle 116 to break up any jam of coins lodged in the slot 78.

Each of the constituent coins of a fare is guided by the feeder 112 into one of the pockets of a rotor 129 (Figs. 4, 8, 10 and 18). This rotor is a thin disk overlying the plate 59 and having a plurality of equally spaced open pockets 130 in its periphery, these pockets being separated by radial arms 130ª. Each of these pockets is of a width, circumferentially of the rotor, at least as great as the diameter of the largest coin which is to be registered by the machine, and each pocket has a bottom wall of convex arcuate curvature, concentric with the axis of the rotor disk. The rotor has a central opening 131 (Fig. 8) which receives the forward end of a shaft 132, the parts being united as by a spline connection to compel the rotor disk to turn with the shaft. The axis of the shaft is perpendicular to the forward face of the plate 59 and at its rear end (Fig. 8) is reduced and screw-threaded at 133 for the reception of a nut 140. This shaft is journaled in bearings 134 and 135 carried by the frame 50. A bevel gear 136 is rotatably mounted on the shaft 132 rearwardly of the bearing 135. A sleeve 137 mounted on the rear portion of the shaft has an annular radial flange 138 which is opposed to the rear face of the gear 136. The sleeve 137 is splined to the shaft 132 so as to rotate therewith and rearward axial movement of this sleeve is limited by a lock washer 139 interposed between the rear end of the sleeve and the nut 140. A collar or annulus 141 loosely encircles the sleeve 137, to the rear of the flange 138, and may be drawn toward the flange by screws 142 having threaded engagement with the gear 136 so as tightly to draw the flange 138 and the gear 136 into contact thereby to provide driving relationship between them. The hub of the gear 136 engages the rear end of the bearing 135. A collar 143, fixed to the shaft 132, engages the forward end of the bearing 135 so that the shaft, rotor and gear are confined against axial movement. In order to adjust the angular position of the rotor, the screws 142 are loosened which permits relative rotation of the shaft and the gear 136. The rotor may then be turned to the desired position of angular adjustment, the shaft 132 turning relatively to the gear 136, and then the screws 142 may be tightened so as to secure the gear to the flange 138. The shaft 132 is rotated by a bevel pinion 144 which engages the gear 136 and which is fixed to a short horizontal shaft 145 by means of a pin 146, the shaft 145 being journaled in bearings 147 and 148 carried by the frame 50.

The rotor 129 in the present instance has twelve pockets 130, and is rotated 1/12 of a revolution during each cycle of operation of the machine and then comes to rest while the gauging, recording and registering of a coin takes place. A Geneva gearing, 150 (Figs. 31 and 32) is employed for turning the rotor intermittently. The star wheel 151 of the Geneva gearing has four equally spaced radial slots 152 and is fixed to the shaft 145 by a pin 153 (Fig. 8). The driver assembly 154 of the Geneva gearing comprises two spaced outer plates 155 and 156 (Fig. 31) with a locking disk 157 (Figs. 31 and 32) interposed between them. A drive roll 158 is also arranged between the plates 155 and 156 and is designed to engage successive radial slots 152 of the start wheel thereby to rotate the latter 1/4 of a revolution for each revolution of the drive assembly 154. The circular portion of the periphery of the locking disk 157 engages the arcuate portions 159 of the star wheel intermediate the slots 152, thereby to lock the star wheel and shaft 145 against rotation except when the drive roll 158 is within one of the slots 152. The driver assembly 154 is mounted on the reduced right-hand end portion 162 (Fig. 31) of a sleeve 160 which is fixed to the main drive shaft 124 (Fig. 31) by a pin 164, the driver assembly 154 of the Geneva gearing being fixed to the sleeve by rivets 165.

The drive shaft 124 is rotated one complete revolution for each cycle of operation of the machine. The means for turning the drive shaft comprises a worm gear 166 (Fig. 31) freely rotatable upon the shaft 124 and driven by a worm 172 fixed to the upper end of the vertical shaft of a motor 171 (Fig. 1) housed within the frame 50. The worm gear 166 (Figs. 25, 26 and 31) has a hub which is reduced at 167 to receive a ratchet wheel 168 (Fig. 24) having a plurality of equally spaced teeth 169, the ratchet wheel 168 (Fig. 25) being attached to the worm wheel 166 (Fig. 25) by rivets 170. A clutch disk 173 (Fig. 24) is mounted on the reduced left-hand end portion 163 (Fig. 31) of the sleeve 160 and is secured thereto by the rivets 165. This disk has a portion of its marginal edge slit and bent outwardly from the plane of the disk to provide an abutment 174 (Fig. 24). A pawl 175, pivotally attached to the disk 173 by a pivot stud 176, has an arm 177 to which is attached a tension spring 178 arranged to urge the pawl 175 into engagement with the teeth 169 of the ratchet 168. The pawl 175 is limited in its movement in one direction by the abutment 174 and in the other direction by a stop 179 carried by the disk 173. If the worm wheel 166 be rotated while the pawl is in engagement with a tooth of the ratchet wheel, the disk 173 will be rotated to turn the drive shaft 124, the engagement of the pawl 175 with the ratchet wheel 168 being controlled by a solenoid 180 (Fig. 22) having a spring pressed plunger (Figs. 22 and 26) which, when the solenoid is not energized, tends to move toward the disk 173 and into the path of movement of the pawl arm 177 so as thereby to swing the pawl out of engagement with the rachet 168. The parts just described constitute what is hereinafter referred to as a one-revolution clutch for connecting the worm wheel 166 and the shaft 124. When the solenoid 180 is energized, the plunger 181 is withdrawn from engagement with the pawl arm 177 thereby allowing spring 178 to engage the pawl 175 with the ratchet 168 so as to rotate the shaft 124.

The starting of a cycle of operation of the machine is brought about by energizing the solenoid 180, and in accordance with the present invention this automatically results from the deposit of a coin in the machine. Various types of automatic circuit closure may be employed for the purpose for example, a magnetic, coin actuated switch, but the one herein chosen for illustration is of the photocell or electronic type. The electronic assembly 183 (Fig. 2) is housed within the outer casing of the machine and may be bodily inserted and removed without disturbing other parts. This electronic assembly comprises a photocell exciter lamp 184 (Fig. 6) encased in a housing 185 which is conveninetly attached to the rear of the door or closure plate 183 (Figs. 5 and 9). The light from the lamp 184 passes through a small window 186 in the door 183 and impinges on a mirror surface 187 carried by or forming a part of the transparent wall portion 58. Light from this mirror is so reflected as to pass through a second window 188, and light so passing through the window 188 activates a photocell 182 arranged at the rear of the wall 59.

A fixed arcuate guard 189 (Figs. 4 and 18) is arranged within the lower portion 81 of the chamber 56 so as partially to embrace the periphery of the rotor 129 and to block all of the rotor pockets which are exposed within the chamber 81 at the right of the vertical plane of the rotor axis except the single pocket 130 which is in registry with the window 186 and which is, at the same time, properly located to receive a coin from the feed member 112, assuming the latter to be in the normal coin-feeder position, as shown in Fig. 18. A coin or token received in this pocket will intercept and block the rays of light from the exciter lamp 184, thus changing the conductivity of the photocell 182. This cell is so connected into an electronic circuit as to energize the solenoid 180 and thereby withdraw the plunger 181 (Figs. 24 and 26) from engagement with the arm 177 of the pawl 175 thereby permitting the pawl to engage the ratchet wheel and thus turn the main shaft 124 one revolution. At each revolution of the main shaft 124, the rotor is turned 1/12 of a revolution. In order that the shaft 124 may start, it is necessary, as above described, that a coin be within that pocket 130 of the rotor which is registered with the window 186. As the rotor starts, it transfers this coin to a registering station while at the same time another pocket of the rotor is brought into registry with the window 186 for the reception of another coin.

At this point it may be noted that the member 73 which carries the lower part 75 of the coin guiding track has a downward extension which assists in guiding coins into the rotor pocket positioned to receive them.

The pockets 130 are of equal size and each of a circumferential extent such that the largest coin to be registered may rest freely on the bottom of the pocket, and of a depth such that the smallest coin to be registered will project outwardly beyond the circumference described by the outer ends of the rotor arms 130ª. The rotor is of a thickness not greatly exceeding the thickness of the largest coin to be registered and the bottom wall of each pocket is arcuately curved concentric with the axis of the rotor. When a coin, occupying one of the rotor pockets, is brought to rest at the gauging station its outer edge projects from the pocket so that it may be contacted by a movable gauging element whose movement toward the axis of the rotor is limited by contact with the coin, the consequent position of the gauging element being utilized to identify the denomination of the coin for registration.

The gauging unit comprises a rigid rocker frame 190 (Figs. 22 and 23) located behind the coin supporting wall 59 and comprising laterally spaced legs 191 and 192 (Fig. 23) joined by transverse bars 193. The leg 191 is longer than the leg 192 and at its lower end has a transversely extending foot 194 substantially parallel to the bars 193. A rigid arm 195 (Fig. 22) integral with the leg 191 at the upper end of the latter projects forwardly substantially perpendicular to the plane defined by the cross bars 193, and a second rigid arm 197 projects forwardly and upwardly from the upper part of leg 192. The frame 190 has aligned journal openings 196 and 198 at its upper part for the reception of a shaft 199 which is journaled in bearings 200 and 201 (Fig. 23) carried by the frame 50. The rocker frame 190 is fixed to the shaft by a pin 202. The legs 191 and 192 abut the respective bearings 200 and 201 at one side of the latter and a collar 204 fixed to the right hand end of the shaft 109 (Fig. 23) engages the opposite side of the bearing 201, thereby preventing axial movement of the shaft 199 and the rocker frame 190. A tension spring 205 (Fig. 22) is secured at one end to the part 190 and at its other end to the frame 50, thereby tending to rock the part 190 counterclockwise as viewed in Fig. 22.

A lever 206 (Fig. 23), having a cam follower roll 207 mounted thereon intermediate its ends, is pivotally supported at one end on a pin 208 projecting from the frame 50 at the left-hand side of the machine. The left-hand end of the lever 206 is pivotally connected to a link 209 (Fig. 23) depending from the arm 195 (Fig. 22) of the frame 190 and pivotally secured to said arm 195 at 210. The follower roll 206 engages a cam 211 (Figs. 23, 26 and 31) which is fixed to or integral with the sleeve 160 which, as above described, is mounted on the main drive shaft 124. Thus on rotation of the drive shaft, the lever 206 will be raised so as to swing the frame 190 in a clockwise direction as viewed in Fig. 22 against the pull of the spring 205.

A gauging finger 212 (Figs. 18 and 22) having an arcuate coin engaging lower edge 212' (Figs. 18 and 22) is fixed to the inclined arm 197 of the frame 190 and extends forwardly through a suitable window 213 in the wall 59. The finger 212 is moved upwardly as the rotor starts and remains raised until a coin has been placed directly beneath it. When one of the pockets 130 of the rotor, with a coin C therein (Fig. 18), has been moved into the gauging station and beneath the finger 212 where it dwells, during the interval between successive movements of the rotor, the latter will be permitted to move downwardly by the action of the spring 205 until its arcuate under surface 212' engages the edge of the coin. The arcuate surface 212' tends to roll the coin so as to centralize it relatively to the finger 212, so as to insure an accurate sizing of the diameter of the coin. The contact of the gauging finger 212 with a coin C held in the top most pocket of the rotor will cause the frame 190 to assume different angular portions with respect to the vertical, depending upon the diameter of the coin gauged. Thus, a dime will position the frame at one angular distance from the vertical, while the largest coin gauged will position the frame at a different angular distance from the vertical, and intermediate sized coins will locate the frame at other angular distances from the vertical.

The coins are registered and totalized on a counter mechanism designated generally by the numeral 213 (Figs. 1 and 36) which may be bodily removed from the supporting frame 50. This counter mechanism comprises a row of counter disks 214 (Fig. 1) which may be used for recording the money value of pennies, nickels and dimes; a second row of counter disks 215 for registering quarters; and a third row of counter disks 216 for registering tokens. The shaft on which the counter disks 214 are mounted has fixed thereon a gear 217 (Figs. 1 and 31) while each of the shafts which carries the counter disks 215 and 216 respectively has fixed thereto a toothed wheel 218 and 219 (Figs. 1 and 37). The gear 217 meshes with a gear 220 (Fig. 31) fixed to the right-hand end 231 of a sleeve 221 which is rotatably mounted on the drive shaft 124. A toothed wheel 222 is fixed on the left-hand end of the sleeve. Rivets 223 secure the gear and wheel to the sleeve, the wheel 222 being positioned adjacent to the right-hand plate 156 of the Geneva gearing assembly. A pawl 224 (Fig. 27) is pivotally attached to the plate 156 at 229 and is provided with a detent 225 designed, at times, to engage a tooth of the wheel 222. The pawl also comprises a trigger arm 227 and has a latching notch 228 (Fig. 27). A latch 230 is pivotally mounted on the plate 256 at 231 (Fig. 27) and is normally held in locking engagement with the notch 228 of the pawl 224 by a spring 232. When the latch 230 engages the notch 228 of the pawl, as shown in Fig. 27, the latter is so positioned that its detent 225 is disengaged from the teeth of the wheel 222. A fixed supporting member 233 (Figs. 26 and 28), having a bore 234 and an arm 235, bifurcated at its end, is mounted on the sleeve 221 with its bifurcated end 235 straddling the end of the bearing 135 (Fig. 31) so that the part 233 is held stationary. A stop stud 236 is fixed to and projects laterally from the part 233 and lies in the path of the outer end 226 of the detent 225 (Figs. 26, 27 and 30). If, when the shaft 124 is rotating, the trigger 227 is tripped, the detent 225, (by reason of the pressure exerted by the latch 230) will be moved counterclockwise to the position shown in Fig. 30, so as to engage a tooth of the wheel 222, and will thereby clutch the wheel 222 to the shaft 124. The angle through which the wheel 222 will turn, during one rotation of the shaft 124, will depend upon the angular location at which the trigger is released. Thus the gear 220 and the pinion 217 may be turned different amounts during any one rotation of the shaft 124. The gear ratio between pinion 217 and gear 220 is such that when the wheel 222 turns a distance only equal to the spacing between two adjacent teeth, the shaft 217 will be rotated an amount sufficient to turn the counter disk 214 of lowest order through one division, that is to say a distance appropriate to register a one-cent piece. To register a nickel, the trigger 227 would be tripped at such a time in the rotation of the plate 156, that, during a single rotation of the shaft 124, the detent would turn the wheel 222 an angular distance equal to five teeth of the wheel, and for a dime it would turn the wheel 222 through an angular distance equal to ten of its teeth. When, during the travel of the wheel 222, the stop stud 236 engages the part 226, the pawl 224 will be turned clockwise (Fig. 27) so as to disengage the detent 225 from the wheel 222 and allow the latch 230 to enter the notch 228 and thereby lock the pawl in inoperative position.

The angular position at which the trigger 227 is tripped is determined by cams or actuator fingers 237, 238 and 239 (Fig. 30) mounted on the rocker frame 190 (Fig. 23), these cams or actuator fingers being located at different distances respectively from the plane of rotation of the wheel 222 so that they may be selectively positioned in the path of movement of the trigger by rocking the member 190. The path of movement of the trigger is indicated in Fig. 30 by the dot and dash line 240. Assuming that the gauging finger 212 has been brought into contact with the edge of a one-cent piece held in the rotor pocket, the frame 190, in response to the resultant position of the finger 212, will be so angularly located as to bring its actuator 239 into the path 240 of the trigger 227. As the shaft 124 turns, the trigger will contact the part 239 and thus allow the detent to engage the wheel 222 at a point such that the wheel will turn one tooth space before the detent is disengaged from the wheel 222 by the action of the stop stud 226. Thus gear 217 will be turned to cause the right-hand counter disk of the series 214 to register one cent. The fingers 237, 238 and 239 are circumferentially positioned with reference to the stop stud 236 so that the detent 235 will engage the wheel 222 at the proper point, during the rotation of the shaft 124, to turn the wheel 222 through the proper angles for registering one-cent pieces, nickles and dimes respectively.

The counter disks 215 and 216 (Fig. 1) are designed to register the number of quarters or tokens deposited and thus the disk of lowest order in each row is turned one division only in response to the deposit of one quarter or one token respectively.

To actuate the counter disks 215 and 216 the clutch disk 173 is provided with a single tooth 241 projecting from its periphery. The toothed wheels 218 and 219 (Fig. 1) are mounted to slide axially of their respective shafts 218ᶜ and 219ᵃ (Fig. 37) to which they are splined and are urged axially to the right (Fig. 1) by compression springs. The rocker frame 190 carries two cams 241 and 243 (Fig. 22) which are positioned selectively to engage the wheels 218 or 219 and thereby axially to move one or the other of the wheels 218 or 219 into the plane of rotation of the disk 173. For example, as shown in Fig. 37, the cam 243 has been positioned by movement of the rocker frame 190 so as to slide the wheel 219 into the plane of rotation of the disk 173. In this position a tooth of the wheel 219 will be engaged by the tooth 241 during each rotation of the shaft 124 and thus the shaft 219ᵃ will be turned just far enough to index the counter disk 216 of the lowest order so as to register one token.

The machine is also provided with a device for emitting an audible signal, this device being designated generally by the numeral 244 (Fig. 34). This signal-emitting device is a unit which may be installed or removed without interference with other parts of the machine. The device operates to produce a distinctive sound or combination of sounds so as audibly to indicate the deposit of a particular kind of coin forming part of the fare. The basic sound for a one-cent piece is emitted by a buzzer 245 (Fig. 34) which, as here illustrated, is mounted on the outside of the housing of the unit 244. A nickel and a dime fare will be identified respectively by one or two strokes of a chime 246 and a token and quarter fare will be identified respectively by one or two strokes of a chime 247. The buzzer 245 and the chimes 246 and 247 are electrically connected into a circuit (not shown) which includes a bank of electrical selector contacts generally designated by the numeral 248 (Figs. 22 and 34). The contacts 249 and 250 of this bank are electrically connected to operate the chime 246 by the action of a solenoid 246′. The contacts 251 and 252 of the bank are electrically connected to operate the chime 247 by the action of a solenoid 247' and the contact 252 of said bank is electrically connected to operate the buzzer 245. A bank of switches, designated generally by the numeral 254 (Figs. 7, 26, 31 and 35), is arranged to close the proper branches of the electrical circuit once during each rotation of the shaft 124 so that the signal-emitting device 244 will emit the desired signal for identifying any particular coin which is registered. The switch bank 254 includes the switch 255 (Fig. 26) operative to close the branch circuit for the chime 246; a switch 256 operative to close the branch circuit for the chime 247; and a switch 257 operative to close the branch circuit for the buzzer 245. The switch 257 is a double switch operative to close the branch circuits leading to both of the solenoids 246' and 247'. The bank 254 of switches also controls a motor switch 258, each of these several switches being operated by one of a series of cams 259 to 262 inclusive, which are mounted on the main shaft 124 to rotate therewith so as to close the switches once at each revolution of the shaft. Since each of the chimes, as here illustrated, is employed to indicate two different components of a fare, for example coins of different denominations, the cams 259 and 260 which close the switches 255 and 256 respectively, each has two operating lobes arranged to close the associated switch twice in each revolution of the shaft 124. At each revolution of the shaft 124 the cam 261 will also close the double switch 257 in the solenoid circuits.

The arm 194 of the rocker 190 carries a brush contact 263 (Fig. 23) which is electrically connected into the circuit, and which is moved by the rocking of the frame 190 to sweep over the bank of contacts 248 and to come to rest in engagement with that particular one of said contacts which corresponds to the coin being gauged. Thus, for example, when a one-cent piece is being gauged by contact of the arm 212 therewith, the brush contact 263 will come to rest in engagement with the contact 253 whereby the buzzer 245 will be operated when the switch 257 is closed by the cam 261. When a nickel is being gauged, the brush contact 263 will come to rest in engagement with the contact 249, and the chime 246 will be operated when the switch 257 is closed by the cam 262, thereby producing one stroke of the chime. When a dime is being gauged, the brush contact 263 will come to rest on the contact 250 and the chime 246 will be caused to operate when the switch 255 is closed by the cam 259, the latter closing the switch 255 twice during rotation of the shaft 144, and thus causing the chime to sound twice. In a similar way the other contacts will be engaged by the brush contact 263 in accordance with the angular position of the rocker frame 190, as determine by the gauging finger 212 and the respective switches will then be closed to energize the buzzer or the respective chimes or combinations or repetitions of sounds from the sounding devices thereby to identify the particular coin being gauged.

As previously noted, the rotor has twelve pockets and is turned 1/12 of a revolution at each cycle of operation of the machine and then stops temporarily while a coin is being gauged. The coins are retained in the pockets of the rotor as the latter turns until they reach the lower part of the rotor path when they are discharged. As here illustrated, the rotor is arranged to retain five coins, including the one which is at the gauging station, and thus the coins constituting a fare are held in full view through the transparent member 58 and in spaced relation after being registered so that the fare may readily be counted.

The coins in the pockets of the rotor, at the lower part of the path of movement of the rotor, are moved through a coin-assorting or screening device (Figs. 9 and 11 to 14) which comprises two plates 264 and 265 (Fig. 14), each of which has a generally arcuate window (Figs. 12 and 9) 266 and 267, respectively, the windows being concentric with the axis of the rotor and being in substantial registry with each other. The plates 264 and 265 are of a combined thickness substantially equalling that of the wall 59, and extend in downward continuation of the latter.

The outer or lower edge of the arcuate window 267 in plate 265 (Fig. 9) is made in step formation, providing edge sections 268, 269, 270 and 271, all of which, except the section 268, project above the adjacent smoothly arcuate lower edge of the window 266. The opposite edge of the window 267 is also made in step formation, providing the edge sections 272 and 273, the section 272 being positioned opposite to the lower section 271 and extending downwardly beyond the adjacent upper edge of the window 266. The step portion 273 is above the upper edge of the window 266, thus forming a recess forwardly of the margin of the plate 264 at the upper part of the window 266. An insert plate 275 (Figs. 11 and 14) of arcuate shape is secured in the recess 274, this plate having its lower edge in step formation, providing edge sections 276, 277, 278 and 279 (Fig. 11) which are positioned in the order enumerated, opposite to the edge sections 268, 269 and 270 (Fig. 9), thus providing (Fig. 11) a plurality of gauging openings 280 to 283, inclusive. A final gauging opening 284 of the series is formed by the opposed edge sections 271 and 272 of the window 267.

An inverted U-shaped member or clip 285 (Fig. 11) having legs 286 and an offset lip 287 (Fig. 15) is mounted on the plate 265 adjacent to the gauging opening 280. The offset lip 287 of this clip lies within the plane of the gauging opening so as to be flush with the plate 265, providing a shoulder 288. Each leg 286 has an elongate slot 289 extending radially of the axis of rotation of the rotor and which receives a pin 290 which is fixed to the plate 265. A spring 291 is secured to the plate 265 and has divergent legs which extend into engagement with the body of the clip 285, the spring tending to move the clip radially toward the opening 280. Similar clips 292, 293 and 294, although without a lip like the lip 287, are similarly mounted adjacent to the gauging openings 281, 282, 283, respectively, each being urged in a radial direction by corresponding springs. The inner or upper edges of each of these last-named clips are spaced from the edge portions 269 and 270 and provided with shoulders 294, 295 and 296.

As the rotor lies in an inclined plane, any coins held in its pockets will, at some point in the rotation, tend to slide outwardly by the action of gravity. To maintain the coins within the pockets 130 so long as is desired, a fixed arcuate guard 297 (Figs. 4, 10 and 11) of a thickness substantially equalling that of the rotor is arranged at one side of the rotor path and at a distance from the periphery of the rotor so as to prevent outward escape of coins from the rotor pockets. A second guard member 298 (Fig. 11) is pivoted at 300 to the plate 295, the guard 298 having a slot 299 at its lower end which receives a stop pin 301 projecting from the plate 265. A spring 302, pivoted at 303, has one end engaging the guard 298 and the other end bearing against the outer edge of the guard 297, thus tending to move the lower finger of the guard 298 into contact with the stop 301. Should a coin of abnormally small diameter move out of the pocket of the rotor so as to lodge or jam between the guard member 298 and the periphery of the rotor, the guard 298 will yield enough to permit the rotor to advance, and in so advancing the jammed coin will be pushed past the member 298. Spacers 304 and 305 (Fig. 11), of a thickness slightly greater than the thickness of the clips 285, etc., are positioned on the plate 265 at the lower corners of the latter, and a cover plate 306 (Fig. 10) overlies these spacers and is secured in position by screws 307 which also secure the plates 264 and 265 to the support 50. The screening or sorting openings 280 to 284 extend arcuately about the lower part of the path of movement of the rotor pockets.

As a coin within one of the rotor pockets is moved across the gauging aperture 280, the marginal edge of the rearwardly leaning coin will bear against the lip 287, with the edge of the coin rolling along the shoulder 288. Should the coin be of a diameter to clear the opposite edge portion 276 of the gauging opening, then the coin will fall rearwardly by gravity through the opening and out of the lower pocket. However, should the coin be of a diameter larger than the up and down or radial width of the opening 280, the upper part of the marginal edge of the coin, as it moves along, will bear against the edge of section 276 and the coin will continue along to the next gauging opening 281 where the marginal edge of the coin will now bear against the edge section 269, with the edge of the coin rolling or sliding along the shoulder 294. Should the coin be of a diameter to clear the edge section 277, the coin will fall rearwardly through the gauging opening 281 and out of the rotor pocket. If the coin be of larger diameter, it will be further advanced until it is eventually brought into register with an opening which is of an up and down or radial width such that the coin may fall rearwardly out of the rotor pocket. Although the coins will usually drop from the pockets by gravity through a gauging opening of a width to permit them to pass, it is desirable, in order to assure rapid ejection of the coins, to provide some means for urging them in a rearward direction. For this purpose the plate 306 is provided with a plurality of openings 308 (Figs. 10 and 16) positioned one opposite to each gauging opening 280 to 284, respectively. A flat spring 209 is secured to the plate 206 by one or more screws 310, with the free end of the spring projecting through the opening 308, the spring being so located that its free end will exert rearward pressure against a coin passing beneath it, thereby to push the coin through the gauging opening if the opening is of a width greater than the diameter of the coin. One of such springs is arranged to cooperate with each gauging opening.

Coins which fall rearwardly through any one of the gauging openings 280 to 284, inclusive, drop into a cavity 311 (Figs. 8 and 17) formed in the front of the frame 50. The plate 264 forms the front wall of this cavity. The lower part of the cavity 311 is divided by walls 312, 313, 314 and 315 (Fig. 12) integral with the frame 50. These walls are continued upwardly to the window 366 by plates 316, each having an ear 217 which is secured by a screw 318 to the frame 50. These walls and plates define a series of coin discharge chutes each leading downwardly from one of the gauging openings 280 to 284, respectively.

A coin receiver 319 (Figs. 1, 2 and 7) is mounted within the casing of the machine at its front and directly below the lower ends of the above coin discharge chutes. This coin receiver 319 is preferably a casting open at top, bottom and front and having a series of partitions 319a (Fig. 7) which, together with the end walls, define a series of compartments 320 each designed to receive coins of a predetermined denomination from one of the coin-discharge chutes of the gauging device. A transparent panel 323 (Figs. 1, 2 and 7) normally forms the front wall of the several compartments 320, the contents of each compartment being visible through this transparent wall. The panel 323 is connected by a spring hinge 324 (Fig. 2) to the casing of the machine so that it may be swung downwardly to afford access to the compartments 320, a handle 324' providing convenient means for moving the panel. The casing of the machine comprises a part 323x (Fig. 2) which extends upwardly from the upper edge of the panel 323 and then inclines upwardly and rearwardly to overlie the front portion of the container 319. The rearwardly extending portion of the part 323x has slots through which coins may be dropped manually into the several compartments 320.

Below the container 319, the casing of the machine has a chamber 321a (Fig. 2), open at the front, for the reception of a coin changer 321 (Fig. 1) having tubular vertical magazines, each designed to receive coins of a single denomination, the several magazines being so arranged as to receive coins from corresponding compartments 320 of the container 319. The coins drop down through the open bottoms of the compartments 320 into the magazines of the changer until the magazines are full, and then collect in the compartments 320 of the container. The coin changer 321 is removable from the casing 49, but may be secured against removal by a normally horizontal lock bar 322 (Fig. 1) pivotally connected at one end to the casing at 322' and designed to be connected at its opposite end to the casing by a padlock or the like.

The operation of the various constituent portions of the machine have been described in connection with the detailed description thereof, and a brief general description of the operation of the machine as a whole will suffice to provide a clear understanding of its action. The machine is electrically driven, and the various elements are connected to operate in properly timed sequence. A main switch 325 (Figs. 1 and 2) controls the electrical circuit. The closing of this main switch lights lamps 326 (Figs. 1 and 4), 327 (Fig. 4) and 340 (Fig. 2) which illuminate the hopper 53 and the chamber 56. When a multiple fare is deposited in the hopper 53, its constituent coins gravitate into the chamber 56 where they separate and pass, one after the other, through the gauging opening 78 (assuming the coins to be of normal shape), and are then guided or fed each into a pocket 130 of the rotor as the rotor dwells with the pocket in coin-receiving position. A coin received in one of the pockets 130 will intercept the light beam from the photocell exciter lamp 184 (Fig. 6) and will thereby change the conductivity of the photocell 182 which, through suitable electronic connections, will initially close the motor circuit to energize the motor. At the same time the solenoid 180 is energized to withdraw its plunger 181 from the path of the pawl 175 so as to permit the pawl to engage the ratchet wheel 168. The engagement of the pawl 175 with the ratchet wheel 168 starts the shaft 124 into rotation. The cam 262, carried by the shaft 124, immediately closes a motor supply circuit through the switch 258 so that the motor will thereafter operate independently of the photocell 182. The rotor now turns a 1/12th revolution by the action of the Geneva motion 150 and the interposed gearing 136 and 144. This partial rotation of the rotor transfers a coin in the pocket 130 to the gauging station where the coin dwells (the rotor stopping to hold the coin in this position), while the gauging finger 212, carried by the rocker frame 190, is swung down into contact with the edge of the coin. Such contact determines the angular position of the rocker frame 190 according to the size of the coin being gauged. The trip fingers and cams carried by the frame 190 will be positioned accordingly so as to engage and trip the trigger 227 or to position one or the other of the wheels 218 or 219 in the path of movement of the tooth 241 on disk 173, depending on the size of the coin being gauged, thereby to actuate the proper counter, as previously described. The brush contact 263 will also be positioned by the rocker frame 190 to engage the proper selector contact 248, and the rotation of the shaft 124 will cause one or another of the cams 159 to 261, inclusive, to close the circuit at one of the switches 254, thereby to sound the proper audible signal to identify the coin being gauged. The motor cam 262 now actuates the switch 258 to open the motor circuit, whereupon the shaft 124 comes to rest, it being noted that during the advance of the rotor, in carrying a coin from the receiving position to the gauging station, the coin passes beyond the rays of the exciter lamp 184 so that the solenoid 180 is immediately de-energized and the plunger 181 is returned to the pawl-blocking position so that, after one complete revolution of the shaft 124, the pawl 175 is disengaged from the ratchet wheel. It will be understood that as one coin is advanced by the rotor, another coin may be fed into a succeeding pocket, and that as often as a coin is delivered into a pocket of the rotor, the shaft 124 will be turned through a complete revolution.

Should non-registerable material be inserted into the machine such as might jam or interfere with the operation of the gauging mechanism, the scavenger closure plate or door 83 may be opened manually by turning the handle 103 so as to permit such material to fall rearwardly and into the passage 107 which leads it down into the closed receptacle 108. It is desirable to open the motor circuit when the scavenger door 83 is open, and for this purpose a switch 328 (Fig. 3) is provided, this switch being attached to the wall 59 and having resilient contacts 329 which tend to spring apart but which are normally kept closed by a cam 330 which is fixed to the shaft 99 which supports the door 83. Thus, when the door is opened, the shaft 99 is turned and thus turns the cam 330 so as to release the contacts 329 and permit them to separate, thereby opening the circuit at the switch 328.

It is also desirable that the shaft 124 be rotatable in one direction only. To this end advantage is taken of the presence of a locking pawl 331 (Fig. 36) forming an element of the counting mechanism and which is pivotally mounted intermediate its ends on the frame of the counting mechanism. This pawl has one end arranged to engage the teeth of a wheel 332 on the shaft which carries the series 214 (Fig. 1) of counter disks, and is normally operative to prevent reverse rotation of the toothed wheel. To prevent reverse rotation of the shaft 124, a cam 333, having a locking lobe 334, is secured to the shaft 124 in position to be engaged by a second arm of detent 331. When turning in the proper direction the cam will, at the proper time, withdraw the detent from the wheel 332 to permit the latter to be turned freely, but if the cam and shaft 124 start to turn in the opposite direction, the shoulder of the cam lobe 334 will engage the arm 331 of the detent and thus prevent such reverse rotation.

The main shaft 124 and the parts carried thereby may be inserted and removed bodily from the machine as a unit. This shaft is journaled (Fig. 31) at one end in the bearing 334 integral with the frame 50, and at the other end in a bearing 335 having a foot portion 336 which is connected to the frame 50 by screws 337. To remove the shaft 124 as a unit, it is merely necessary to remove the screws 337, after which the shaft with the bearing 335 may be removed.

The counter device 213 is a self-contained unit and secured in position in the frame 50 by screws 341 (Fig. 7). By removing these screws the entire counter unit may be removed from the machine.

The electronic assembly 183 (Fig. 2) is held in position by a depending bracket arm 342 which is attached to the frame 50 by screws 343. This unit can be removed from the machine by removing the screws 343.

The sounding device 244 is a self-containedd unit and is secured to the frame 50 by screws 344 (Fig. 2) and may be removed from the machine by first removing these screws.

While one desirable embodiment of the invention has herein been illustrated and described by way of example, it is to be understood that the invention is broadly inclusive of any and all modifications falling within the scope of the appended claims.

I claim:

1. Fare collecting apparatus comprising in combination, a hopper capable of receiving a multiple coin fare, coin guiding means onto which coins drop from the hopper, said guiding means including an inclined coin supporting plate against which coins lean as they move downwardly by gravity, normally fixed track sections which incline downwardly in opposite directions transversely of the plate, one of said sections terminating above the other so that coins discharged from the first section drop onto the lower section, and a third track section means pivotward continuation of the second, said third track section having an upwardly convex surface a portion of which rises appreciably above the plane of inclination of the second track section and means yieldingly supporting said third section whereby it may move in response to pressure of coins thereby to prevent a coin jam.

2. Fare collecting apparatus comprising in combination, a hopper capable of receiving a multiple coin fare, coin guiding means onto which coins drop from the hopper, said guiding means including an inclined coin supporting plate against which coins lean as they move downwardly by gravity, normally fixed track sections which incline downwardly in opposite directions transversely of the plate, one of said sections terminating above the other so that coins discharged from the first section drop onto the lower section, and a third track section means pivotally supporting said third track section forwardly of the lower end of said second track section in the direction of travel of the coins, said third track section having an upwardly convex coin engaging edge and spring means normally holding the third track section with the rear end of its convex surface rising upwardly toward the plane of inclination of the second track section and with its forward end falling away from said plane, said third track section being yieldable rearwardly in response to coin pressure to prevent jamming of coins.

3. Fare collecting apparatus comprising in combination, a hopper capable of receiving a multiple coin fare, coin guiding means onto which coins drop from the hopper, said guiding means including an inclined coin supporting plate against which coins leans as they move downwardly by gravity, normally fixed track sections which incline downwardly in opposite directions transversely of the plate, one of said sections terminating above the other so that coins discharged from the first section drop onto the lower section, and a third track section having an upwardly convex edge onto which coins drop when leaving the second track section, said third section also having a depending leg portion defining one side of a coin-feeding chamber, means pivotally supporting said third section and a spring which holds the third section in normal position but permits said section to swing in response to pressure of coins.

4. Fare collecting apparatus comprising in combination, a hopper capable of receiving a multiple coin fare, coin-guiding means onto which coins drop from the hopper, said guiding means comprising a fixed inclined coin supporting element against which coins lean as they move downwardly by gravity, and track sections which incline downwardly in opposite directions transversely of the coin support and along which coins roll into a fare-receiving space, the supporting element having a slot therein which registers with the first of said track sections, means so supporting said latter track section as to permit it to be withdrawn rearwardly through said slot from the coin path thereby to permit material lodged upon said section to drop freely, the coin support having a normally closed discharge opening at a point spaced from said slot with a door for closing it, and means for opening the door to allow material to drop rearwardly therethrough concomitantly with the withdrawal of the track section.

5. Fare collecting apparatus comprising in combination, a hopper capable of receiving a multiple coin fare and means defining a path for coins which drop from the hopper, said path defining means comprising a fixed plate inclined downwardly from rear to front against which coins lean as they move along said path, track elements along which coins roll and become separated as they move downwardly, and a transparent cover overlying the track elements and together with the plate defining a chamber which is too shallow to permit a coin to tip over, and wherein coins are clearly visible, one at least of the track sections normally projecting forwardly through a slot in the plate, the plate having therein an aperture which is spaced from said slot and which is normally closed by a door, means for supporting the door and said track section, and manually actuable means operative simultaneously to open the door and to withdraw the track section rearwardly out of the coin path.

6. A fare collecting apparatus including parts driven by an electric motor and comprising means defining a normal coin path, said means including a support against which coins lean as they move along, said support having a scavenger opening therein, a movably mounted closure for said opening normally disposed in closed position but movable to open position to permit non-registrable material inserted in the machine to escape from the coin path through said scavenger opening, means for moving the closure in and out of closed position, a switch in the electrical circuit of the motor, and means responsive to the opening of said closure to open said switch thereby to stop the motor.

7. Fare collecting and registering apparatus comprising in combination, a hopper capable of receiving a multiple coin fare, means defining a path for coins which drop from the hopper, said path-defining means comprising a downwardly and forwardly inclined coin support against which coins lean as they move along the path, means defining a feeding station, track elements extending transversely of the coin support along which the coins roll and become separated as they move downwardly toward the feeding station, means for gauging the diameter of each coin, means, including an intermittently turning rotor, operative to receive each coin at the feeding station and to transfer it to said gauging means, and coin-arresting means operative to prevent a coin of abnormal thickness, moving along said path, from reaching the feeding station.

8. In a motor driven machine for collecting and recording fares, a casing, a hopper mounted on the casing for the reception of fares, guide means within the casing defining a path which leads to a feeding station, a rocking feed arm forming one wall of said feeding station, said rocking arm having a concave coin-engaging surface, means for rocking the arm, a rotary coin transfer device having a pocket for the reception of a coin and, means, including Geneva gearing, for intermittently turning the transfer device to cause it to dwell with one of its pockets at the feeding station to receive a coin and thereafter to remove the coin to a gauging station.

9. Fare collecting and registering apparatus comprising in combination, a hopper capable of receiving a multiple coin fare, means defining a path for coins which drop from the hopper, said path-defining means comprising a downwardly and forwardly inclined coin supported against which coins lean as they move along the path, track elements extending transversely of the coin support along which the coins roll and become separated as they move downwardly, means for gauging the diameter of a coin, means, including an intermittently turning rotor, operative to receive a coin at a feeding station and to transfer it to the gauging station, the rotor having peripheral pockets each designed to receive a single coin, and means to direct a coin into a pocket of the rotor while said pocket dwells at the feeding station, and means engageable by a coin entering said last-named pocket to operate signal means.

10. In apparatus for collecting multiple coin fares, in combination, a casing having a fare-receiving chamber therein, a hopper capable of receiving a multiple coin fare, means for guiding the fare from the hopper into said chamber, inclines in said chamber along which the fare rolls downwardly while its constituent coins spread and separate in passing from one incline to another, a rotor provided with a plurality of coin-receiving pockets, a coin feeder extending into said chamber and operative to guide and feed a coin into a pocket of the rotor, and means for rotating the rotor to transfer coins held in said pockets to a coin-gauging station.

11. Fare collecting and registering apparatus comprising in combination, a hopper capable of receiving a multiple coin fare, means defining a path for coins which drop from the hopper, said path defining means comprising a downwardly and forwardly inclined coin support against which coins lean as they move along the path toward a feeding station, means for gauging the diameter of a coin, means, including an intermittently turning rotor, operative to receive a coin at the feeding station and to transfer it to a gauging station, the rotor having peripheral pockets each designed to receive a single coin, a rocker arm operative to guide a coin into a pocket of the rotor, and manually actuable means for rocking said arm thereby to break up a jam of coins at the feeding station.

12. Fare collecting and registering apparatus comprising in combination, a hopper capable of receiving a multiple coin fare, means defining a path for coins which drop from the hopper, said path defining means comprising a downwardly and forwardly inclined coin support against which coins lean as they move along the path toward a feeding station, means for gauging the diameter of a coin, means, including an intermittently turning rotor, operative to receive a coin at the feeding station and to transfer it to a gauging station, the rotor having peripheral pockets each designed to receive a single coin, and a part having a concave coin-engaging surface operative to guide a coin into the pocket of the rotor while the latter dwells at the feeding station.

13. In apparatus for collecting multiple coin fares, a casing having a fare-receiving chamber therein, an incline in said chamber along which the fare rolls downwardly, one unit of fare after another, into a lower portion of the chamber, a rotor, a portion of which is located in the lower part of said chamber, the rotor having a plurality of coin-receiving pockets, and a rockably mounted coin feeder in the lower part of said chamber, said coin feeder being arranged to engage a coin in the lower part of said chamber and to guide and feed the coin into a pocket of the rotor.

14. In a machine for collecting fares, in combination, a casing having a fare-receiving chamber therein, an incline in said chamber along which the fare rolls downwardly into a lower or feeding portion of said chamber, a rotor, a portion of which is located in the feeding portion of the chamber, the rotor having a plurality of coin-receiving pockets, a rockable coin feeder extending into the feeding portion of the chamber, said coin feeder being operative to guide a fare into one of the pockets of the rotor, and cam-actuated means for rocking the feeder.

15. Fare collecting and registering apparatus comprising in combination, a hopper capable of receiving a multiple coin fare, means defining a path for coins which drop from the hopper, said path defining means comprising a downwardly and forwardly inclined coin support against which coins lean as they move along the path toward a feeding station, means for gauging the diameter of a coin, means, including an intermittently turning rotor, operative to receive a coin at the feeding station and to transfer it to a gauging station, the rotor having peripheral pockets each designed to receive a single coin, a rocker arm operative to guide a coin into a pocket of the rotor, and cam means for moving the rocker arm to facilitate the entry of a coin into the rotor pocket.

16. In a motor driven machine for collecting and registering fares, a casing, a hopper mounted on the casing for the reception of fares, guide means within the casing, said guide means defining a zigzag path which leads to a feeding station, a rocking feed arm forming one wall of said feeding station, said rocking arm having a concave coin-engaging surface, power-actuated means for rocking the rocking arm, and mechanical means for transferring a coin from the feeding station to a gauging station.

17. In a machine for collecting coin fares, a casing having a fare-receiving chamber therein, an incline in said chamber along which a fare rolls downwardly into a lower portion of the chamber, a rotor having a portion within said lower portion of the chamber, the rotor having a plurality of coin-receiving pockets, a rockable coin feeder extending into said lower portion of the chamber, the feeder being operative to engage a coin and to guide the latter into one of the rotor pockets, cam-operated means for swinging the coin feeder in one direction, and spring means urging the coin feeder in the opposite direction.

18. Fare collecting and registering apparatus comprising in combination, a hopper capable of receiving a multiple coin fare, means defining a path for coins which drop from the hopper, said path-defining means comprising an inclined coin support against which coins lean as they move along the path, means defining a coin feeding station, means for gauging the diameter of a coin while it leans against said support, means for transferring coins successively from the feeding station to the gauging station while they continue to lean against said support, a motor for actuating the gauging means and transfer means, and means for registering the value of each coin as it is gauged.

19. In combination in a fare collecting and registering machine, registering means comprising a counter-carrying shaft and means for turning it, gauging means comprising a movable arm and a coin contactor carried thereby, means for moving the arm through different angles in accordance with the size of coin engaged by the coin contactor, and means carried by said arm operative, in accordance with its angular position, to determine the angle through which said counter-carrying shaft shall turn.

20. Fare collecting and registering apparatus, a hopper capable of receiving a multiple coin fare, means defining a coin path of a contour such that coins passing along it become separated so as to move in succession, means for arresting abnormally thick coins and for discharging them from the coin path, a movable gauging element at a gauging station, means for transferring a coin from a feeding station at the end of said coin path to the gauging station, means for moving the gauging element into contact with the edge of the coin at the gauging station, a coin register having a rotatable shaft, drive means for turning the register shaft, and means responsive to the position assumed by the coin-gauging element, when contacting a coin at the gauging station, to determine the angle through which said drive means shall turn the register shaft.

21. In a multiple coin fare collecting and registering machine, including a main drive shaft which makes one revolution for each cycle of operation of the machine, a gauging element actuable by the main drive shaft for determining the diameter of a coin and a register having an actuating shaft, means for transmitting motion from the main shaft to the register shaft, said means including a clutch having normally disengaged parts, a spring tending to engage said clutch parts thereby to drive the register shaft, a latch normally holding said clutch parts disengaged, a trigger arm which revolves with the main shaft, means, controlled by the gauging element, engageable with said trigger arm at different selected points in the path of revolution of the arm to actuate the trigger arm and thereby permit the clutch parts to engage, and means operative at a later point in the rotation of the main shaft to disengage the clutch parts.

22. In a multiple coin fare collecting and registering machine, including a main drive shaft which makes one revolution for each cycle of operation of the machine, a gauging element actuable by the main drive shaft for determining the diameter of a coin and a register having an actuating shaft, means for transmitting motion from the main shaft to the register shaft, said means including a clutch having normally disengaged parts, means tending to engage said clutch parts, latch means normally holding said clutch parts disengaged, a latch release element which revolves with the main shaft, means, controlled by the gauging element, operative, after a predetermined fractional portion of the rotation of the main shaft, to actuate the latch release element thereby to allow the clutch parts to engage, and a fixed abutment, operative at a predetermined later point in the rotation of the main shaft, to disengage said clutch parts.

23. In a multiple coin fare collecting and registering machine, including a main drive shaft which makes one revolution for each cycle of operation of the machine, a gauging element actuable by the main drive shaft for determining the diameter of a coin and a register having an actuating shaft, means for transmitting motion from the main shaft to the register shaft, said means including a clutch having normally disengaged parts, a latch normally holding the clutch parts disengaged, means tending to engage the clutch parts, an arm which revolves with the main shaft, a plurality of arm-actuating elements spaced circumferentially of the path of revolution of said arm and which are selectively movable into arm-engaging position by the gauging element whereby in accordance with the diameter of a coin being gauged the arm will be actuated by one of said elements to permit engagement of the clutch parts after a predetermined fractional portion of a revolution of the main drive shaft, and means operative at a later point in the revolution of the main shaft to disengage the clutch parts.

24. In a multiple coin fare collecting and registering machine, a counter register, means including a gear pinion for turning the counters of said register, a rotatable shaft, means for rotating said shaft one revolution at each cycle of operation of said machine, a ratchet wheel member rotatably mounted on said shaft and having a gear mounted thereon extending into engagement with said pinion to rotate the same, a trigger operated pawl engageable with said ratchet wheel and mounted for rotation with said shaft and normally held out of engagement with said ratchet wheel, means for holding a coin at a position to be identified for the registration thereof, a gauging arm rockably mounted with one end thereof movable into engagement with the edge of said coin, cams carried by said arm and movable therewith to be positioned in the path of rotational movement of said pawl at a location therein predetermined by the size of said coin gauged to release said pawl into engagement with said ratchet wheel whereby to rotate said gear a predetermined partial rotation of said shaft at a revolution thereof.

25. In a multiple coin fare collecting machine as set forth in claim 24 in which said arm is spring urged into engagement with said coin and mechanically moved in the other direction.

26. In a multiple coin fare collecting machine as set forth in claim 24 in which said pawl is spring urged into engagement with said ratchet wheel.

27. In a multiple coin fare collecting and registering machine, a plurality of counters each for a different kind of coin to be registered, each counter having a shaft rotatable for operating the same, a gear pinion on each shaft rotatable therewith and movable axially thereof, a rotatable main shaft, means for rotating said main shaft one revolution, a wheel on said main shaft rotatable therewith and having a gear tooth thereon engageable with each of said gear pinions for turning the same, means for holding a coin at a position to be identified for the registration thereof, a gauging arm rockably mounted with one end thereof movable into engagement with the edge of said coin, means carried by said arm and movable therewith into engagement with one of said gear pinions to move it into the path of movement of said gear tooth to be engaged to be turned thereby.

28. Fare collection and registering apparatus comprising coin gauging means engageable with an edge of a coin and displaceable thereby different amounts depending upon the diameter of the coin, a cycling shaft which turns one revolution for each cycle of the machine, means, including a rotary registering shaft, for registering coins of different diameters, means for turning the registering shaft comprising an actuator part which is coaxial with the cycling shaft, clutch means for temporarily clutching the actuator part to the cycling shaft, and means carried by the gauging means for operating the clutch means to clutch the actuator part to the cycling shaft at different times in the cycle of rotation of said shaft according to the size of different coins respectively.

29. Apparatus according to claim 28, further characterized in that the actuator part comprises a ratchet wheel mounted loosely on the cycling shaft and the clutch means comprises a detent revolving with the cycling shaft and which at times clutches the ratchet wheel to the cycling shaft.

30. Apparatus according to claim 29, comprising a spring which is operative alternatively to hold the detent in neutral position or in engagement with the ratchet wheel.

31. Apparatus according to claim 29, comprising detent disengaging means, said disengaging means comprising a stationary part located in the path of rotation of the detent and which, as the cycling shaft turns, disengages the detent from the rachet wheel.

32. Apparatus according to claim 29, including means operative at each revolution of the cycling shaft to dispose the detent in neutral position, means including a trigger, connected to the detent, for moving the latter into operative engagement with the ratchet wheel, a plurality of movable detent setting elements spaced apart and at substantially equal distances from the axis of the cycling shaft, coin-identifying means, and means responsive to said coin-identifying means for placing one or another of the respective detent setting elements, according to the identity of a given coin, in position to contact the trigger and thereby engage the detent with the ratchet wheel.

33. Apparatus according to claim 32, wherein the coin-identifying means comprises a rigid gauging finger engageable with the edge of a coin and whose position is determined by the diameter of the coin, and wherein the detent setting elements are mounted on a part whose position varies with that of the gauging finger.

34. Apparatus according to claim 32, wherein the coin-identifying means comprises a rigid lever having a short arm which constitutes a coin-gauging element and a relatively longer arm on which the detent setting elements are fixed, said longer arm moving in a path such as to place one or another of the detent setting elements in the path of revolution of the trigger according to the diameter of a given coin.

35. Apparatus according to claim 32, wherein the coin-identifying means comprises a rigid lever pivoted to swing about an axis which is in a vertical plane at right angles to the vertical plane of the cycling shaft, said lever having a short arm which constitutes a coin-gauging element and a longer arm in the form of an open frame defining an aperture through which the cycling shaft passes, the trigger setting elements being mounted on said frame.

36. Apparatus according to claim 35, having spring means tending to swing the lever to contact the gauging finger with a coin, and cam means on the cycling shaft for moving the lever in the opposite direction.

37. In a machine of the class described, a cycling shaft having fixed thereto a supporting part to which a detent member is pivoted, a ratchet wheel which is normally free to turn on the shaft but which turns with the shaft when engaged by the detent member, a spring carried by said supporting part and which is operative alternatively to hold the detent in operative engagement with the ratchet wheel or in a neutral position respectively, a trigger arm fixed to the detent member and by means of which the latter may be caused to move from neutral position into operative engagement with the ratchet wheel, a tail member projecting from the detent, a fixed abutment with which said tail member engages at each successive full revolution of the cycling shaft and which is operative to shift the detent out of engagement with the rachet wheel in neutral position, coin-gauging means, and means responsive to the position of the coin-gauging means for moving the trigger arm thereby to engage the detent with the ratchet wheel at different times, respectively, in the cycle of rotation of the cycling shaft, according to sizes of different coins.

38. In a machine of the class described, a cycling shaft having fixed thereto a supporting part to which a detent member is pivoted, a ratchet wheel which is normally free to turn on the shaft but which turns with the shaft when engaged by the detent member, a spring carried by said supporting part and which is operative alternatively to hold the detent in operative engagement with the ratchet wheel or in a neutral position respectively, a trigger arm fixed to the detent member and by means of which the latter may be caused to move from a neutral position into operative engagement with the ratchet wheel, a tail member projecting from the detent, a fixed abutment with which said tail member engages at each successive full revolution of the cycling shaft and which is operative to shift the detent out of engagement with the ratchet wheel into neutral position, a plurality of detent setting elements disposed in spaced relation about the circumference of a circle whose center is at the axis of the cycling shaft, and means for moving one or another of said detent setting elements into the path of revolution of the trigger arm, said latter means comprising a coin-gauging element.

39. In a machine of the class described, a cycling shaft having fixed thereto a supporting part to which a detent member is pivoted, a ratchet wheel which is normally free to turn on the shaft but which turns with the shaft when engaged by the detent member, spring means operative alternatively to hold the detent in operative engagement with the ratchet wheel or in a neutral position respectively, a trigger arm fixed to the detent member and by means of which the latter may be caused to move from a neutral position into operative engagement with the ratchet wheel, a tail member projecting from the detent, a fixed abutment with which said tail member engages at each successive full revolution of the cycling shaft and which is operative to shift the detent out of engagement with the ratchet wheel into neutral position, a rigid lever having a relatively short arm constituting a coin-gauging element, the lever also comprising a relatively long arm having therein an opening through which the cycling shaft passes, and a plurality of detent setting elements mounted on said latter arm, said detent setting elements being so relatively arranged that one or another of them is in position to be engaged by the trigger arm as the latter revolves, according to the position of the coin-gauging element as determined by the size of a given coin.

40. In a machine of the class described, a cycling shaft having fixed thereto a supporting part to which a detent member is pivoted, a ratchet wheel which is normally free to turn on the shaft but which turns with the shaft when engaged by the detent member, spring means operative alternatively to hold the detent in operative engagement with the ratchet wheel or in a neutral position respectively, a trigger arm fixed to the detent member and by means of which the latter may be caused to move from a neutral position into operative engagement with the ratchet wheel, a tail member projecting from the detent, a fixed abutment with which said tail member engages at each successive full revolution of the cycling shaft and which is operative to shift the detent out of engagement with the ratchet wheel into neutral position, detent setting elements spaced apart and at substantially equal distances from the axis of the cycling shaft, and means for causing one or another of said detent setting elements to be engaged by the trigger arm, as the supporting part revolves, according to the size of a given coin.

41. In a machine of the class described, a cycling shaft, a ratchet wheel which is normally free to turn on the shaft, a supporting part which turns with the shaft, a detent pivoted on said supporting part and which, when it engages the ratchet wheel, turns the latter with the cycling shaft, means operative at a predetermined angular position in each revolution of the cycling shaft to move the detent away from the ratchet to a neutral position, means operative to restore the detent to operative engagement with the ratchet at any one of a plurality of angular positions of the shaft as the latter rotates, and means responsive to the diameter of a given coin to determine at which of said angular positions of the shaft the detent shall engage the ratchet wheel.

42. In a machine of the class described, a cycling shaft, a ratchet wheel which is normally free to turn on the shaft, a supporting part which turns with the shaft, a detent pivoted on said supporting part and which when it engages the ratchet wheel turns the latter with the cycling shaft, means operative at a predetermined angular position in each revolution of the cycling shaft to move the detent away from the ratchet to a neutral position, means operative to restore the detent to operative engagement with the ratchet at any one of a plurality of angular positions of the shaft as the latter rotates, and coin-diameter gauging means operative, by contact with a given coin, to determine at which of said angular positions of the shaft the detent shall engages the ratchet wheel.

References Cited in the file of this patent

UNITED STATES PATENTS

| | | | |
|---|---|---|---|
| 370,261 | Kail | Sept. 20, 1887 |
| 465,740 | Welsh | Dec. 22, 1891 |
| 468,981 | Milliken | Feb. 16, 1892 |
| 539,885 | Taylor | May 28, 1895 |
| 544,620 | Heublein | Aug. 13, 1895 |
| 598,545 | Volkmann | Feb. 8, 1898 |
| 837,337 | Patterson | Dec. 4, 1906 |
| 852,111 | Fritsche | Apr. 30, 1907 |
| 908,688 | Mulkey | Jan. 5, 1909 |
| 914,821 | Gierding | Mar. 9, 1909 |
| 940,816 | McKee | Nov. 23, 1909 |
| 967,725 | Carnell | Aug. 16, 1910 |
| 975,202 | Batdorf | Nov. 8, 1910 |
| 1,032,843 | Kohler | July 16, 1912 |
| 1,041,614 | Gebhart | Oct. 15, 1912 |
| 1,068,785 | Kohler | July 29, 1913 |
| 1,081,958 | Greay | Dec. 23, 1913 |
| 1,114,851 | Branham | Oct. 27, 1914 |
| 1,291,317 | Whistler | Jan. 14, 1919 |
| 1,344,841 | Woodward | Apr. 29, 1920 |
| 1,344,898 | Johnson | June 29, 1920 |
| 1,355,875 | Whistler | Oct. 19, 1920 |
| 1,365,469 | Eagan | Jan. 11, 1921 |
| 1,708,189 | Paden | Apr. 9, 1929 |
| 1,731,352 | Schermack | Oct. 15, 1929 |
| 1,781,353 | Trajahn | Nov. 11, 1930 |
| 1,790,725 | Schermack | Feb. 3, 1931 |
| 1,850,148 | Brandt | Mar. 22, 1932 |
| 1,853,052 | Horton | Apr. 12, 1932 |
| 1,893,828 | Graeme | Jan. 10, 1933 |
| 1,895,975 | Daugherty | Jan. 31, 1933 |
| 1,912,803 | Thompson | June 6, 1933 |
| 1,932,014 | Frankford | Oct. 24, 1933 |
| 1,965,926 | Lewis | July 10, 1934 |
| 2,015,640 | Watling | Sept. 24, 1935 |
| 2,033,930 | DuGrenier | Mar. 17, 1936 |
| 2,141,950 | Colburn | Dec. 27, 1938 |
| 2,292,628 | Fry | Aug. 11, 1942 |
| 2,309,790 | Ross | Feb. 2, 1943 |
| 2,338,575 | Daugherty | Jan. 4, 1944 |
| 2,339,823 | Vogel | Jan. 25, 1944 |
| 2,342,016 | Schweitzer | Feb. 15, 1944 |
| 2,351,197 | Francis | June 13, 1944 |
| 2,377,413 | Fry | June 5, 1945 |
| 2,414,619 | Thompson | Jan. 21, 1947 |
| 2,423,502 | Jorgensen | July 8, 1947 |
| 2,519,357 | Daugherty | Aug. 22, 1950 |
| 2,532,978 | Wilcox | Dec. 5, 1950 |
| 2,533,654 | Wilcox | Dec. 12, 1950 |
| 2,547,102 | Wallach | Apr. 3, 1951 |
| 2,555,176 | Wilcox | May 29, 1951 |
| 2,578,226 | Cavanaugh | Dec. 11, 1951 |
| 2,594,422 | Gordon | Apr. 29, 1952 |
| 2,614,673 | Obodzinski | Oct. 21, 1952 |
| 2,630,200 | Hehn | Mar. 3, 1953 |
| 2,642,073 | Ingraham | June 16, 1953 |
| 2,685,406 | Haas et al. | Aug. 3, 1954 |

UNITED STATES PATENT OFFICE
CERTIFICATE OF CORRECTION

Patent No. 2,848,158

Harry B. Miller

August 19, 1958

It is hereby certified that error appears in the printed specification of the above numbered patent requiring correction and that the said Letters Patent should read as corrected below.

Column 18, lines 5 and 6, strike out "the lower section, and a third track section means pivot- ward" and insert instead -- the lower section, a third track section forming a downward --; line 36, for "leans" read -- lean --; column 19, line 56, for "supported" read -- support --.

Signed and sealed this 28th day of October 1958.

(SEAL)
Attest:

KARL H. AXLINE
Attesting Officer

ROBERT C. WATSON
Commissioner of Patents